United States Patent
Ciaccio et al.

(10) Patent No.: US 10,124,793 B2
(45) Date of Patent: Nov. 13, 2018

(54) SYSTEMS AND METHODS FOR SUPPLYING POWER IN A HYBRID VEHICLE USING CAPACITORS, A BATTERY AND ONE OR MORE DC/DC CONVERTERS

(71) Applicant: GENTHERM INCORPORATED, Northville, MI (US)

(72) Inventors: Michael Peter Ciaccio, Chelsea, MI (US); Brian Moorhead, Willis, MI (US)

(73) Assignee: GENTHERM INCORPORATED, Northville, MI (US)

(*) Notice: Subject to any disclaimer, the term of this patent is extended or adjusted under 35 U.S.C. 154(b) by 145 days.

(21) Appl. No.: 15/208,112

(22) Filed: Jul. 12, 2016

(65) Prior Publication Data

US 2017/0253231 A1 Sep. 7, 2017

Related U.S. Application Data

(60) Provisional application No. 62/302,372, filed on Mar. 2, 2016.

(51) Int. Cl.
*F02N 11/08* (2006.01)
*B60W 20/15* (2016.01)
(Continued)

(52) U.S. Cl.
CPC ............ *B60W 20/15* (2016.01); *B60L 11/005* (2013.01); *B60L 11/12* (2013.01); *B60L 11/1874* (2013.01);
(Continued)

(58) Field of Classification Search
CPC ............. B60L 11/1874; B60Y 2300/63; F02N 11/0866; F02N 2011/0885;
(Continued)

(56) References Cited

U.S. PATENT DOCUMENTS 6,202,615 B1* 3/2001 Pels ..................... F02N 11/0866
123/179.21
6,242,887 B1* 6/2001 Burke ................ F02N 11/0866
320/104
(Continued)

FOREIGN PATENT DOCUMENTS

DE 4028242 A1 3/1992
DE 19628222 A1 1/1998
(Continued)

OTHER PUBLICATIONS

California Environmental Protection Agency Air Resources Board. "Draft Technology Assessment: Medium- and Heavy-Duty Battery Electric Trucks and Buses"; Oct. 2015; 4 pages.
(Continued)

*Primary Examiner* — Levi Gannon

(57) ABSTRACT

A power management system for a hybrid vehicle including an engine includes a vehicle power bus distributing power from a battery to vehicle loads. A capacitor includes one of a plurality of supercapacitors and a plurality of ultracapacitors. A starter/generator controller communicates with the capacitor and the battery. A power management module is configured to supply current from the capacitor to the starter/generator controller during cranking of the engine; and supply current from the battery to the starter/generator controller during the cranking of the engine. The power supplied by the battery is greater than or equal to 2% and less than or equal to 20% of a total power supplied to the starter/generator controller during the cranking of the engine.

33 Claims, 18 Drawing Sheets

(51) Int. Cl.

| | | |
|---|---|---|
| *B60L 11/00* | (2006.01) | |
| *B60L 11/18* | (2006.01) | |
| *H02J 7/00* | (2006.01) | |
| *B60L 11/12* | (2006.01) | |
| *B60R 16/033* | (2006.01) | |
| *B60W 20/00* | (2016.01) | |
| *F02N 11/04* | (2006.01) | |
| *H01M 12/00* | (2006.01) | |
| *H02J 7/14* | (2006.01) | |
| *B60W 10/26* | (2006.01) | |
| *B60L 7/10* | (2006.01) | |
| *H02M 3/04* | (2006.01) | |

(52) U.S. Cl.
CPC ........... *B60R 16/033* (2013.01); *B60W 20/00* (2013.01); *F02N 11/04* (2013.01); *F02N 11/0866* (2013.01); *H01M 12/005* (2013.01); *H02J 7/0026* (2013.01); *H02J 7/1423* (2013.01); *B60L 7/10* (2013.01); *B60L 2210/12* (2013.01); *B60L 2210/14* (2013.01); *B60L 2210/30* (2013.01); *B60L 2240/44* (2013.01); *B60W 10/26* (2013.01); *B60W 2510/244* (2013.01); *B60Y 2300/63* (2013.01); *F02N 2011/0885* (2013.01); *F02N 2011/0888* (2013.01); *F02N 2011/0896* (2013.01); *F02N 2200/061* (2013.01); *F02N 2200/062* (2013.01); *F02N 2200/063* (2013.01); *F02N 2200/064* (2013.01); *H02J 2007/0059* (2013.01); *H02M 3/04* (2013.01); *Y10S 903/93* (2013.01)

(58) Field of Classification Search
CPC ..... F02N 2011/0888; F02N 2011/0896; F02N 2200/061–2200/064; H01M 12/005
USPC ....................................................... 307/10.6
See application file for complete search history.

(56) References Cited

U.S. PATENT DOCUMENTS

| | | | | |
|---|---|---|---|---|
| 6,371,067 | B1* | 4/2002 | Schmitz | F02N 11/0866 123/179.28 |
| 6,871,625 | B1* | 3/2005 | Burke | F02N 11/0866 123/179.1 |
| 7,319,306 | B1* | 1/2008 | Rydman | F02N 11/0866 320/166 |
| 2002/0020381 | A1* | 2/2002 | Pels | F02N 11/0862 123/179.3 |
| 2006/0060236 | A1 | 3/2006 | Kim | |
| 2008/0265586 | A1 | 10/2008 | Like et al. | |
| 2008/0276892 | A1* | 11/2008 | Doljack | F02N 11/0866 123/179.28 |
| 2009/0056661 | A1 | 3/2009 | Cook et al. | |
| 2009/0096285 | A1 | 4/2009 | Acena et al. | |
| 2009/0160249 | A1* | 6/2009 | Soma | B60L 11/005 307/9.1 |
| 2012/0156534 | A1 | 6/2012 | Sujan et al. | |
| 2013/0127399 | A1 | 5/2013 | Tang et al. | |
| 2013/0154543 | A1 | 6/2013 | Richardson et al. | |
| 2013/0213336 | A1* | 8/2013 | Solberg | F02N 11/0866 123/179.3 |
| 2013/0264869 | A1* | 10/2013 | Klinkig | B60R 16/03 307/10.6 |
| 2013/0320764 | A1* | 12/2013 | Zeller | H02J 7/345 307/48 |
| 2014/0200763 | A1 | 7/2014 | Sisk | |
| 2015/0298557 | A1 | 10/2015 | Sakata et al. | |
| 2015/0300307 | A1* | 10/2015 | Setterberg | F02N 11/087 701/113 |

FOREIGN PATENT DOCUMENTS

| | | |
|---|---|---|
| DE | 29723175 U1 | 4/1998 |
| DE | 102004062939 A1 | 7/2006 |
| DE | 102005051433 A1 | 5/2007 |
| DE | 102007003005 A1 | 2/2008 |
| DE | 102009006665 A1 | 8/2010 |
| DE | 102014203030 A1 | 8/2015 |
| EP | 0945959 A2 | 9/1999 |
| EP | 2607178 A1 | 6/2013 |
| EP | 2567424 B1 | 8/2015 |
| FR | 2923551 A1 | 5/2009 |
| JP | 2013242979 A | 12/2013 |
| KR | 101157413 B1 | 6/2012 |
| WO | WO-9912044 A2 | 3/1999 |
| WO | WO-0014402 A1 | 3/2000 |
| WO | WO-2006121005 A1 | 11/2006 |
| WO | WO-2011097188 A1 | 8/2011 |
| WO | WO-2013027982 A2 | 2/2013 |

OTHER PUBLICATIONS

IDTechEx. "A very different supercapacitor bus". Web site: http://www.electricvehiclesresearch.com/articles/6974/a-very-different-supercapacitor-bus; printed May 9, 2016; 2 pages.

Dr. A. Schneuwly, Dipl. Ing. J. Auer, Dr. J. Miller. Maxwell Technologies SA. White Paper: "Ultracapacitors Help to Overcome the Prospective Energy Requirements of Vehicles". Apr. 2009; 21 pages.

International Search Report and Written Opinion dated Aug. 14, 2017 corresponding to International Application No. PCT/US2017/020228, 27 pages.

International Search Report and Written Opinion dated Sep. 19, 2017 corresponding to International Application No. PCT/US2017/020236, 38 pages.

U.S. Appl. No. 15/208,143, filed Jul. 12, 2016, Ciaccio et al.

U.S. Appl. No. 15/434,765, filed Feb. 16, 2017, Ciaccio et al.

International Search Report for Application No. PCT/US2017/020222 dated Jun. 14, 2017.

Kendall, John. 2017 SAE International Article: "PSA's new stop/start system uses ultracaps for energy storage, extra power"; website: <http://articles.sae.orq/8412/>; Jun. 21, 2010; 2 Pages.

Warner, Brad. "Valeo i-StARS and ReStart Innovations Offer Affordable Hybrid Solutions for Internal Combustion Engines"; Feb. 27, 2012; website: <http://www.prnewswire.com/news-releases/valeo-i-stars-and-restart-innovations-offer-affordable-hybrid-solutions-for-internal-combustion-engines-140549873.html>; 2 Pages.

Werkstetter, Stefan, "White Paper: Ultracapacitor Usage in Wind Turbine Pitch Control Systems"; Maxwell Technologies, Inc. Jan. 2015; website: http://www.maxwell.com/images/documents/Wind_Turbine_Pitch_Control_White%20Paper_3000722_1.pdf; 10 Pages.

Miller, Gretchen. "Johnson Controls to unveil new battery system for Advanced Start-Stop vehicles at the North American International Auto Show." Johnson Controls; Jan. 8, 2015; website: <http://www.prnewswire.com/news-releases/johnson-controls-to-unveil-new-battery-system-for-advanced-start-stop-vehicles-at-the-north-american-international-auto-show-300017559.html>; 2 Pages.

"In-market Application of Start-Stop Systems in European Market." FEV Inc.; Final Report/Dec. 2011; P26844-01/ A1/ 01/ 61605; website: http://www.theicct.org/sites/default/files/FEV_LDV%20EU%20Technology%20Cost%20Analysis_StartStop%20Overview.pdf; 108 Pages.

Radu, Mihnea. "Hybrid Renault Megane Confirmed for 2017 with dCi Diesel Engine". Sep. 26, 2015; website: https://www.autoevolution.com/news/hybrid-renault-megane-confirmed-for-2017-with-dci-diesel-engine-100384.html; 4 Pages.

"Brake Energy Regeneration System: i-ELOOP continuously recovers kinetic energy as the vehicle decelerates and reuses it as electricity". MAZDA: Environmental Technology website: http://www.mazda.com/en/innovation/technology/env/i-eloop/; 4 Pages, Jul. 12, 2017.

"BU-205: Types of Lithium-ion". Battery University website: http://batteryuniversity.com/learn/article/types_of_lithium_ion; last updated Jun. 28, 2017; 22 Pages.

(56) References Cited

OTHER PUBLICATIONS

Ashley, Steven. 2013 SAE International Article: "Supercapacitors aim to charge ahead"; website: http://articles.sae.org/12554/; Oct. 25, 2013; 2 Pages.

"CAP-XX Introduces Prismatic Supercapacitors For Automotive Stop-Start Applications"; website: http://www.electric-vehiclenews.com/2012/03/cap-xx-introduces-prismatic.html; Mar. 14, 2012; 3 Pages.

"Mazda's i-ELOOP regenerative braking system". Mazda USA; You Tube video: https://www.youtube.com/watch?v=BJHAr4wA2fc; published on Oct. 30, 2012.

PCT—Invitation to Pay Additional Fees and, Where Applicable, Protest Fee dated Jun. 7, 2017 for PCT Application No. PCT/US2017/020236, including Annex to Form PCT/ISA/206: Communication Relating to the Results of the Partial International Search; 15 pages.

Burkert, Andreas. "Power for the Future with 48 V". MTZ Magazine, Jan. 2016, vol. 77; 5 Pages.

\* cited by examiner

SYSTEMS AND METHODS FOR SUPPLYING POWER IN A HYBRID VEHICLE USING CAPACITORS, A BATTERY AND ONE OR MORE DC/DC CONVERTERS

CROSS-REFERENCE TO RELATED APPLICATIONS

This application claims the benefit of U.S. Provisional Application No. 62/302,372, filed on Mar. 2, 2016. The entire disclosure of this application is incorporated herein by reference.

CROSS-REFERENCE TO RELATED APPLICATIONS

This application is related to U.S. Provisional Application No. 62/302,386, filed on Mar. 2, 2016, U.S. application Ser. No. 15/208,143 filed on Jul. 12, 2016, and U.S. application Ser. No. 15/434,765, filed on Feb. 16, 2017. The entire disclosure of each of the applications is incorporated herein by reference.

FIELD

The present disclosure relates to hybrid vehicles and more particularly to systems and methods for supplying power in a hybrid vehicle using capacitors, a battery and one or more DC/DC converters.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid vehicles typically use a powertrain system including an engine, a stop-start or mild hybrid system including a starter/generator and/or one or more electric motors for propelling the vehicle. During operation, current needs to be supplied to start the engine, to supply loads connected to a vehicle power bus, to restart the engine, to drive the electric motors or starter generator to move the vehicle and/or to recharge the batteries. For example in some mild hybrids, the electric motors or starter generator drive the vehicle for brief periods such as 1-2 seconds during restarts to eliminate engine hesitation as the engine cranks, starts and reaches idle or other engine speed (hereinafter referred to as e-boost). As a result, significant engineering effort has been invested to improve the battery systems of hybrid vehicles to meet the increasing current loads.

The automotive industry has also proposed using batteries operating at higher voltage levels such as 24V, 36V and 48V and/or systems incorporating supercapacitors or ultracapacitors. However, these systems are fairly complex since they still need to operate with legacy 12V vehicle systems and components.

Some vehicle battery systems include a 12V battery in addition to a higher voltage battery, a supercapacitor or an ultracapacitor. However, these systems require a full capacity 12V battery, such as 100 Ah, in addition to the higher voltage battery, supercapacitor or ultracapacitor.

SUMMARY

A power management system for a hybrid vehicle including an engine includes a vehicle power bus that distributes power from a battery to vehicle loads. A capacitor includes one of a plurality of supercapacitors and a plurality of ultracapacitors. A starter/generator controller is connected to the capacitor and the battery. A power management module is configured to supply power from the capacitor to the starter/generator controller during cranking of the engine; and supply power from the battery to the starter/generator controller during the cranking of the engine. The power supplied by the battery is greater than or equal to 2% and less than or equal to 20% of a total power supplied to the starter/generator controller during the cranking of the engine.

In other features, the battery has a current/capacity ratio that is less than or equal to 6. A capacity of the battery is less than or equal to 20 Ah. The current from the battery is limited to less than or equal to 100 amps during cranking. An overvoltage protection circuit is connected to the battery. A first current detector circuit is connected in series with the battery. A second current detector circuit is connected in series with the capacitor.

In other features, a DC/DC converter is connected between the capacitor and the vehicle power bus. The DC/DC converter controls current flowing from the battery to the starter/generator controller during cranking of the engine. The DC/DC converter includes a DC/DC boost converter connected between the capacitor and the vehicle power bus; and a DC/DC buck converter connected between the capacitor and the vehicle power bus.

In other features, during cranking of the engine, the power management module disables the DC/DC buck converter and enables the DC/DC boost converter. The power management module controls the DC/DC boost converter to control current flow supplied by the battery to the starter/generator controller during the cranking.

In other features, an electric motor or starter/generator drives is connected to the starter/generator controller. The cranking of the engine is followed by an e-boost event. Power is supplied to the electric motor or the starter/generator during the e-boost event. The power management module is further configured to supply power from the capacitor to the starter/generator controller during the e-boost event; and supply power from the battery to the starter/generator controller during the e-boost event. The power supplied by the battery is greater than or equal to 2% and less than or equal to 20% of a total power supplied to the starter/generator controller during the e-boost event.

In other features, an AC/DC converter is connected to the starter/generator controller. A starter/generator is connected to the AC/DC converter and the engine. The power management module is further configured to recharge the capacitor using power generated by the starter/generator during a regeneration event; and to control the flow of power from the starter generator or the capacitor to the battery during the regeneration event. The power supplied to the battery is greater than or equal to 2% and less than or equal to 20% of total power supplied during the regeneration event.

A method for providing power in a hybrid vehicle including an engine includes distributing power from a battery to vehicle loads; supplying power from a capacitor to a starter/generator controller during cranking of the engine, wherein the capacitor includes one of a plurality of supercapacitors and a plurality of ultracapacitors; and supplying power from the battery to the starter/generator controller during the cranking of the engine, wherein the power from the battery is greater than or equal to 2% and less than or equal to 20% of a total power supplied to the starter/generator controller during the cranking of the engine.

In other features, the battery has a current/capacity ratio that is less than or equal to 6. A capacity of the battery is less than or equal to 20 Ah. The current from the battery is limited to less than or equal to 100 amps during the cranking.

In other features, the method includes detecting current supplied by the battery; and detecting current supplied by the capacitor. The method includes controlling the current flowing from the battery to the starter/generator controller during cranking of the engine.

In other features, the method includes connecting a DC/DC boost converter between the capacitor and a vehicle power bus; and connecting a DC/DC buck converter between the capacitor and the vehicle power bus.

In other features, during cranking of the engine, the method includes disabling the DC/DC buck converter and enabling the DC/DC boost converter. The method includes controlling the DC/DC boost converter to control current flow supplied by the battery to the starter/generator controller during cranking.

In other features, the method includes driving wheels of the hybrid vehicle using an electric motor or starter generator, wherein the cranking of the engine is followed by an e-boost event; and supplying current to the electric motor or starter generator during the e-boost event.

In other features, the method includes supplying power from the capacitor to the starter/generator controller during the e-boost event; supplying power from the battery to the starter/generator controller during the e-boost event; and supplying the power from the battery greater than or equal to 2% and less than or equal to 20% of a total power supplied to the starter/generator controller during the e-boost event.

In other features, the method includes connecting an AC/DC converter to the starter/generator controller; and connecting a starter/generator the AC/DC converter and the engine.

In other features, the method includes recharging the capacitor using power generated by the starter/generator during a regeneration event; and controlling flow of power from the starter generator or the capacitor to the battery during the regeneration event. The method includes controlling the power supplied by the starter generator or capacitor to the battery to greater than or equal to 2% and less than or equal to 20% of total power supplied during the regeneration event.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
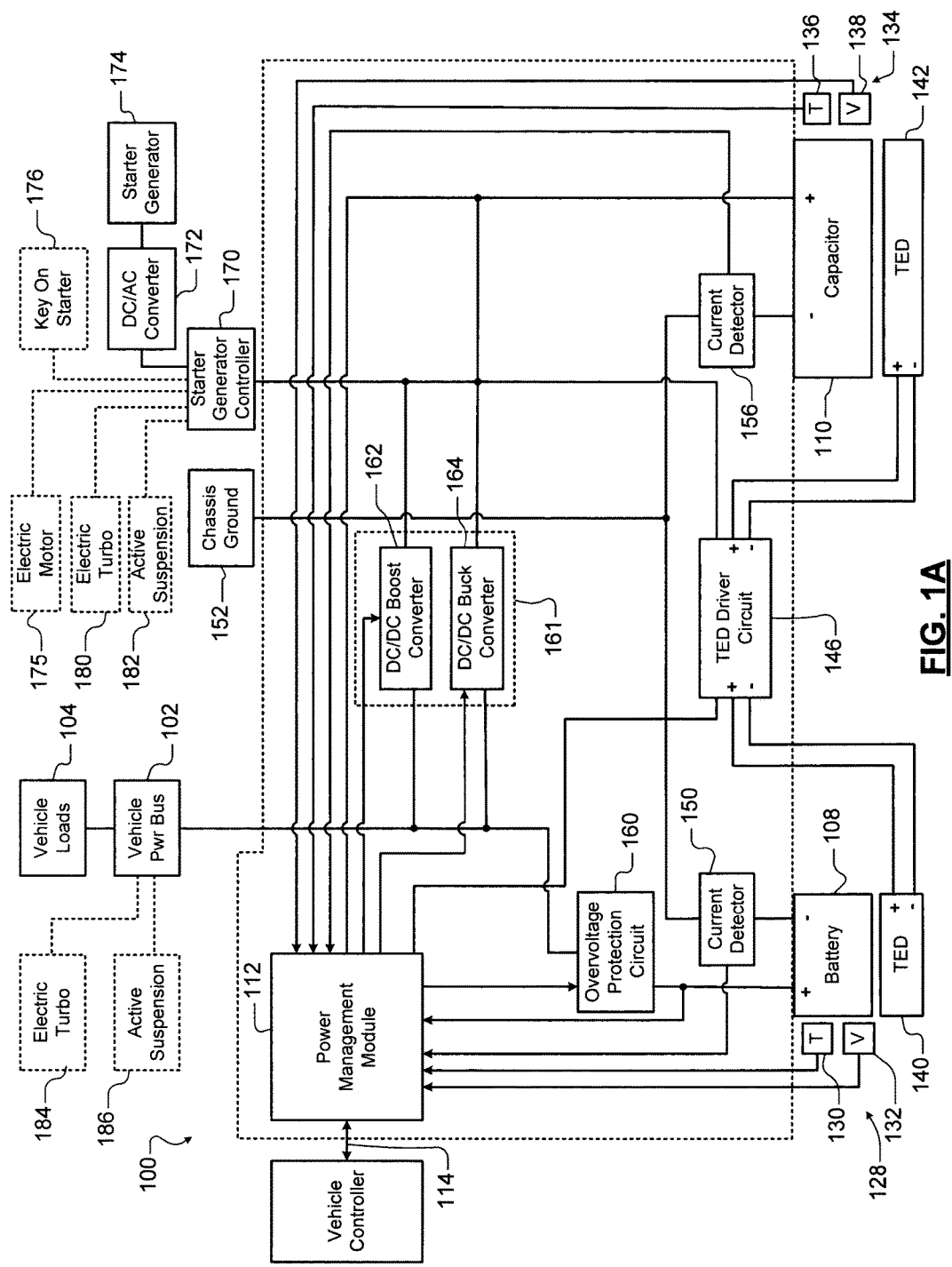
FIG. 1A is a functional block diagram of an example of a power management system for supplying power from and recharging of a battery and a capacitor according to the present disclosure.

In systems and methods for supplying power in a hybrid vehicle according to the present disclosure, higher current loads that occur during starting or e-boost events are predominantly supplied by a capacitor such as a supercapacitor or an ultracapacitor. Current is also supplied by a battery at a limited and controlled rate during these events. As a result, the capacity and physical size of the battery can be substantially reduced while keeping the discharge rate (or C-rate) of the battery to a reasonable level.

In conventional battery systems, cranking after a "key-on" event is solely supported by the battery. As a result, the battery needs to have a sufficient capacity and discharge rate.

The discharge rate or C-rating is defined as a ratio of current/capacity. For example, a first battery can supply 850 A and has a capacity of 100 Ah (C-rate of 850 A/100 Ah=8.5). In contrast, a second battery can supply 850 A and has a capacity of 17 Ah (C-rate of 850 A/17 Ah=50). While both batteries supply the same amount of current, the second battery will have a significantly shorter battery life than the first battery in similar applications. In other words, the C-rate of the battery directly affects battery life and higher C-rates correspond to shorter battery life.

Unlike other hybrid battery topologies, the battery used in the power management system according to the present disclosure does not independently support key-on engine starting. The main function of the battery is to directly support vehicle loads such as boardnet loads. The battery also supplies controlled and limited current flow to indirectly support key-on engine starts and hybrid drive cycle events such as engine re-starting and/or electric boost. The battery is also used to recharge the capacitor after cranking.

Current supplied during regenerative/engine braking is used to recharge the capacitor rather than the battery. Power from the capacitor is fed to the battery at a limited and controlled rate over time, which reduces battery peak charge loads. In the systems and methods described herein, battery requirements are driven by energy rather than voltage drop at cranking amps, which allows a smaller capacity battery to be used.

The present disclosure can also be configured to support pulse-type vehicle loads, such as electric turbo systems or electric active suspension systems, by selectively supplying current from the capacitor via the starter/generator controller or the AC/DC converter. Having the capacitor supply the pulse-type vehicle loads improves battery life and minimizes the requirements, size and cost of the battery.

The specifications of the battery can be varied based on the severity of the hybrid drive cycle and pulse-type boardnet loads that are expected for a given application. In general, the battery requirements, size and cost will be lower than hybrid topologies where the battery directly or substantially contributes to the hybrid drive cycle.

The packaging cost of the battery and wiring are greatly reduced though integration of the battery into an integrated battery and capacitor assembly. Additional packaging details of the integrated battery and capacitor assembly can be found in U.S. Application No. 62/302,386, filed on Mar. 2, 2016, which is incorporated by reference in its entirety.

Referring now to FIG. 1A, a power management system 100 for controlling the supply of power from and recharging of a battery 108 and a capacitor 110 is shown. In some examples, the battery includes a 12 V battery including multiple battery cells connected in series and/or parallel to positive and negative battery terminals. In some examples, the battery cells are made using lithium iron phosphate (LiFePO$_4$) chemistry. In other examples, the battery cells are made using lithium titanate (Li$_4$Ti$_5$O$_{12}$) (LTO) chemistry, or any other lithium ion chemistry. In some examples, the battery 108 includes pouch cells arranged in a 4 sNp configuration. VDA style can cells could also be used. In some examples, the battery 108 provides 12.8 V nominal (8.0V to 14.4 V) and has a capacity of 20 Ah/256 Wh. In other examples, the battery has a capacity less than or equal to 20 Ah and a C-rate less than or equal to 6.

In some examples, the capacitor 110 includes multiple capacitor cells connected in series and/or parallel to positive and negative capacitor terminals. In some examples, the capacitor 110 includes supercapacitors or ultracapacitors. In some examples, the capacitor 110 provides 12V, 24V, 36V, or 48V nominal (0-54 V). In some examples, a pouch cell format is used for capacitor cells in the capacitor. In other examples, a VDA can cell format is used for capacitor cells in the capacitor. In some examples, the capacitors are connected in an 18 sNp configuration and have a capacity of 0.6 Ah (30 Wh).

A power management module 112 controls the supply of power from and recharging of the battery 108 and the capacitor 110. The power management module 112 may communicate over a vehicle data bus 114 with other vehicle controllers and/or with components of the power management system 100. The power management module 112 may transmit data such as state of charge (SOC) and state of health (SOH) for the battery 108 and the capacitor 110 to other vehicle controllers. In some examples, the vehicle data bus 114 includes a CAN bus, although other data bus types can be used. In some examples, the power management module 112 receives information such as key-on events, vehicle speed, drive mode events, engine oil temperature, regeneration events, e-boost events or other control information from other vehicle controllers. Vehicle speed may be indicative of a future regeneration event. Engine oil temperature may be indicative of engine load during cranking. The power management module 112 may adjust operation of the power management system 100 based on these signals.

In some operating modes, the power management module also controls the supply of current to a vehicle power bus 102 and vehicle loads 104 such as boardnet loads. The power management module 112 receives battery operating parameters from one or more sensors 128 such as temperature sensors 130 and/or voltage sensors 132. In some examples, the temperature sensors 130 and the voltage sensors 132 monitor temperatures and voltages at the battery cell level. The power management module 112 also receives capacitor operating parameters from sensors 134 such as temperature sensors 136 and/or voltage sensors 138. In some examples, the temperature sensors 136 and the voltage sensors 138 monitor temperatures and voltages at the capacitor cell level.

Temperature control of the battery 108 and/or the capacitor 110 may be provided by thermoelectric devices (TEDs) 140 and 142, respectively. A TED driver circuit 146 controls to the TEDs 140 and 142. The power management module 112 selectively actuates the TED driver circuit 146 as needed to control the temperature of the battery 108 and the capacitor 110. In some examples, the TEDs 140 and/or 142 include one or more heating/cooling zones that allow individual and independent temperature control of one or more battery cells or capacitor cells.

A current detector circuit 150 detects current supplied by the battery or supplied to the battery during recharging. The current detector circuit 150 may be arranged between a negative terminal of the battery 108 and chassis ground 152. A current detector circuit 156 detects current supplied by the capacitor 110 or supplied to the capacitor 110 during recharging. The current detector circuit 156 may be arranged between a negative terminal of the capacitor 110 and the chassis ground 152. The current detector circuits 150 and 156 provide sensed battery current and capacitive current values, respectively, to the power management module 112.

An overvoltage protection circuit 160 may be arranged between a positive terminal of the battery 108 and loads such as the vehicle power bus 102. The overvoltage protection circuit 160 monitors a voltage output of the battery and provides a voltage value to the power management module 112. The overvoltage circuit 160 protects the battery from overcharging when one or more cells is at or above a voltage limit of the battery cell. Another function of the overvoltage circuit 160 is to protect the battery from excessive current. If an over voltage condition is detected, the battery 108 may be disconnected or other actions may be taken. For example, excessive voltage or current may occur during charging with an external charger.

In some examples, the power management module 112 performs battery management including cell voltage measurement, cell balancing, temperature measurement, current limits calculations, state of charge (SOC) estimation and/or state of health (SOH) estimation based on the measured battery parameters. In some examples, the power management module 112 also performs capacitor management including cell voltage measurement, cell balancing, temperature measurement, current limits calculations, SOC estimation and/or SOH estimation based on measured capacitor parameters.

A DC/DC converter 161 may be provided to control flow of the current between the battery 108, the capacitor 110 and/or a starter/generator 174. In some examples, the DC/DC converter 161 includes a DC/DC boost converter 162 and a DC/DC buck converter 164 that are connected between the battery 108, the capacitor 110 and the starter/generator 174. In some examples, the DC/DC boost converter 162 has an input range of 8V to 16V and a current input range of 0-100 Amps. In some examples, the DC/DC boost converter 162 has an output range of 24V to 54V and a current output range of 0-67 Amps.

In some examples, the DC/DC buck converter 164 has an input range of 24V to 54V and a current input range of 0-53 Amps. In some examples, the DC/DC buck converter 164 has an output range of 8V to 16V and a current output range of 0-80 Amps. As can be appreciated, the ratings of the DC/DC boost converter 162 and the DC/DC buck converter 164 will vary for different applications.

A starter/generator controller 170 is connected to the DC/DC boost converter 162, the DC/DC buck converter 164, and the capacitor 110. The starter/generator controller 170 is also connected to a DC/AC converter 172, which is connected to the starter/generator 174. The starter/generator 174 is connected to an engine (not shown). In some examples, one or more electric motors 175 for driving the wheels may be provided.

The vehicle power bus 102 may also be connected to an electric turbo 184 and/or an active suspension system 186, which operate at the voltage of the battery 108. Alternately, an electric turbo 180 and/or an active suspension system 182 may be connected to the starter/generator controller 170 or the AC/DC converter if they operate at higher voltages such as 24V, 36V, 48V, etc.

In some examples, a key-on starter 176 may be connected to the starter/generator controller 170 and may be provided for starting larger displacement engines requiring higher starting current. The key-on starter 176 may be supplied by current from the capacitor 110 and assisted in a limited and controlled manner by current supplied by the battery 108 as described above.

Figure 1B:
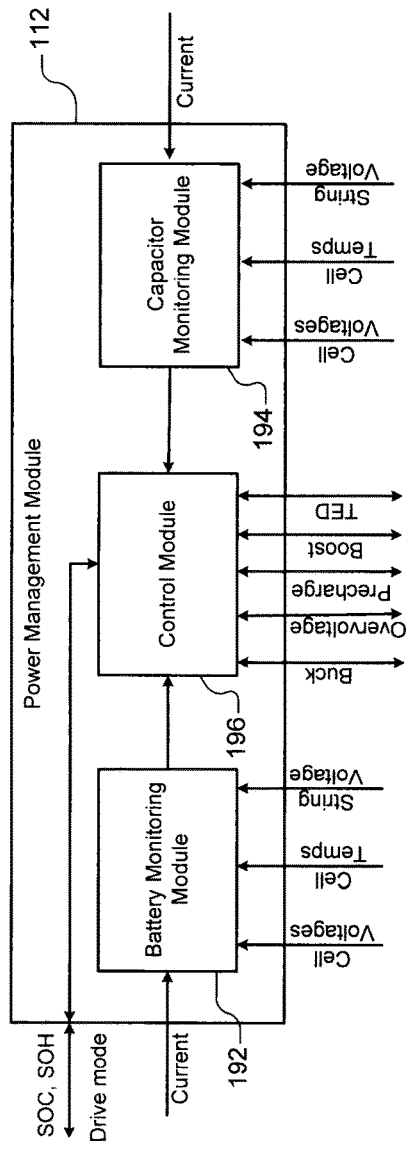
FIG. 1B is a more detailed functional block diagram of an example of a power management module in FIG. 1A.

Referring now to FIG. 1B, an example of the power management module 112 is shown in further detail. The power management module 112 includes a battery monitoring module 192, a capacitor monitoring module 194 and a control module 196. The battery monitoring module 192 receives cell voltages, battery current, cell temperatures and/or string voltage as described above in FIG. 1A. The battery monitoring module 192 performs cell balancing, calculates state of charge (SOC) and/or state of health (SOH) values for the battery 108. The capacitor monitoring module 194 also receives cell voltages, capacitor current, cell temperatures and/or string voltage as described above in FIG. 1A. The capacitor monitoring module performs cell balancing, calculates SOC and/or calculates SOH for the capacitor 110.

The control module 196 communicates with the battery monitoring module 192 and the capacitor monitoring module 194. The control module 196 may also receive information such as key-on events, vehicle speed, engine oil temperature, drive mode events, regeneration events, e-boost events or other control information from other vehicle controllers via the vehicle data bus 114. The control module 196 may also share SOC and SOH values for the battery 108 and the capacitor 110 with other vehicle controllers via the vehicle data bus 114.

The control module 196 enables and disables the DC/DC converter 161. For example, the control module enables and disables the DC/DC buck converter 164 and the DC/DC boost converter 162 as needed during the various drive or operating modes. The control module 196 also monitors operation of the overvoltage protection circuit 160. The control module 196 also communicates with the TED driver circuit 146 to control heating/cooling of zones in the TEDs 140 and 142 associated with the battery 108 and the capacitor 110.

Figure 1C:
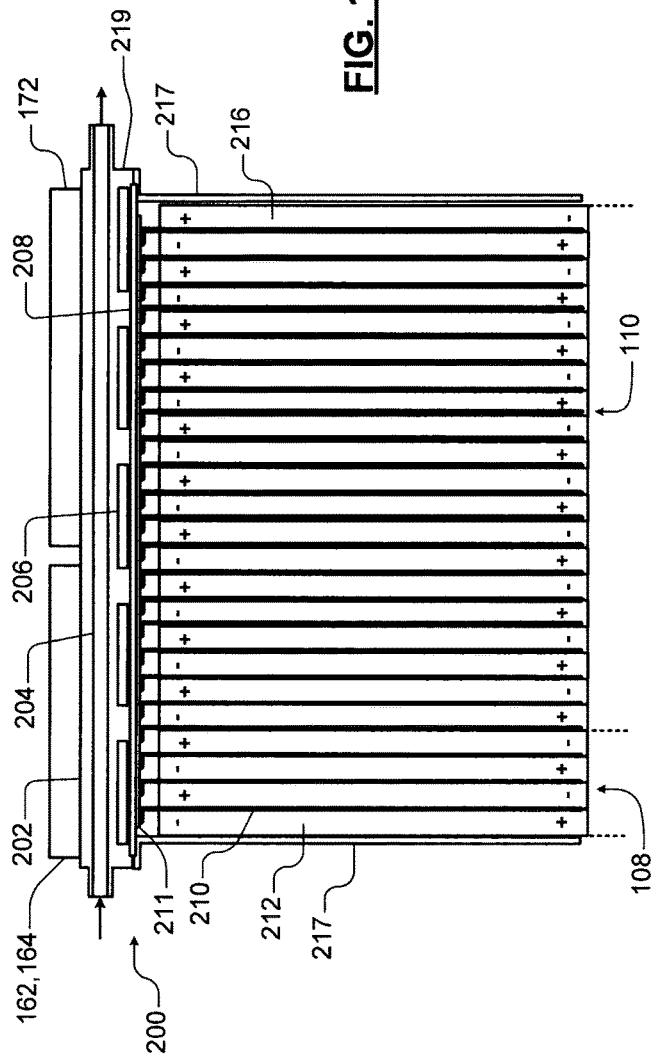
FIG. 1C is a cross-sectional view of an integrated battery and capacitor assembly with heating and cooling capability according to the present disclosure.

Referring now to FIG. 1C, an example of a battery and capacitor assembly 200 is shown. The battery 108 and the capacitor 110 include cells 212 and 216, respectively, that are arranged adjacent one another between mounting brackets 217. The cells 212 and 216 may include pouch-type cells. Heatsinks 210 are arranged between the cells 212 and 216 to dissipate heat. In some examples, the heatsinks 210 are generally "L"-shaped. The mounting brackets 217 are mounted alongside outwardly-facing surfaces of outer ones of the cells 212 and 216 and ends of the mounting brackets 217 are mounted to a cooling plate assembly 219. The mounting brackets 217 provide compressive force on the pouch-type capacitive and battery cells located therebetween during operation.

The cooling plate assembly 219 includes a heat spreader 208 which dissipates or spreads out hot or cold spots along surfaces thereof to equalize temperature variation. In some examples, the heat spreader 208 may also be split into zones with thermal separation therebetween so that the battery and the capacitor may be maintained at different temperatures. Ends of the heatsinks 210 are in thermal contact with the heat spreader 208. Alternately, thermal interface material 211 may be arranged between the heatsinks 210 and the heat spreader 208. If used, the thermal interface material 211 may include a foam gap pad, thermal grease, a two-part thermal filler, graphite foil, filled silicone sheet or other suitable material.

In other examples, thermal Interface material (not shown) may be arranged between the DC/DC boost and buck converters 162 and 164 and the cooling plate assembly 219. Thermal Interface material (not shown) may also be arranged between the DC/AC converter 172 and the cooling plate assembly 219.

The cooling plate assembly 219 also includes embedded TEDs 206 that may be arranged and connected in one or more heating/cooling zones. The TEDs are generally compressed between the heat spreader 208 and the cooling plate assembly 219. The cooling plate assembly 219 further includes a coolant channel 204 through which cooling fluid flows. In some examples, the DC/DC boost converter 162 and the DC/DC buck converter 164 are in thermal contact (or a heat exchange relationship) with an outer surface of the cooling plate assembly 219. Likewise, the DC/AC converter 172 is also in thermal contact or a heat exchange relationship with the outer surface of the cooling plate assembly 219. Additional packaging details can be found in U.S. Application No. 62/302,386, filed on Mar. 2, 2016.

Figure 2A:
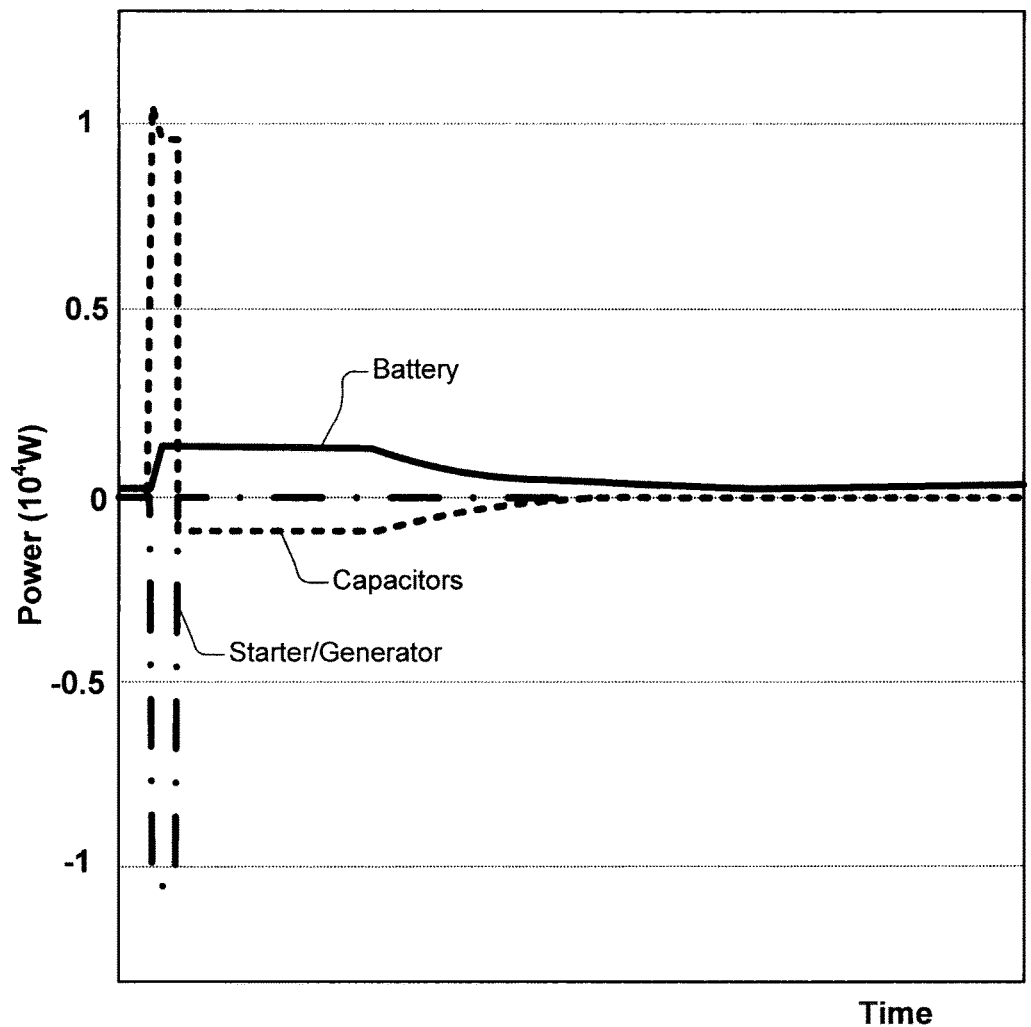
FIGS. 2A and 2B are graphs of examples of power and current as a function of time supplied by the battery and the capacitor during a cold start according to the present disclosure.
Figure 2B:
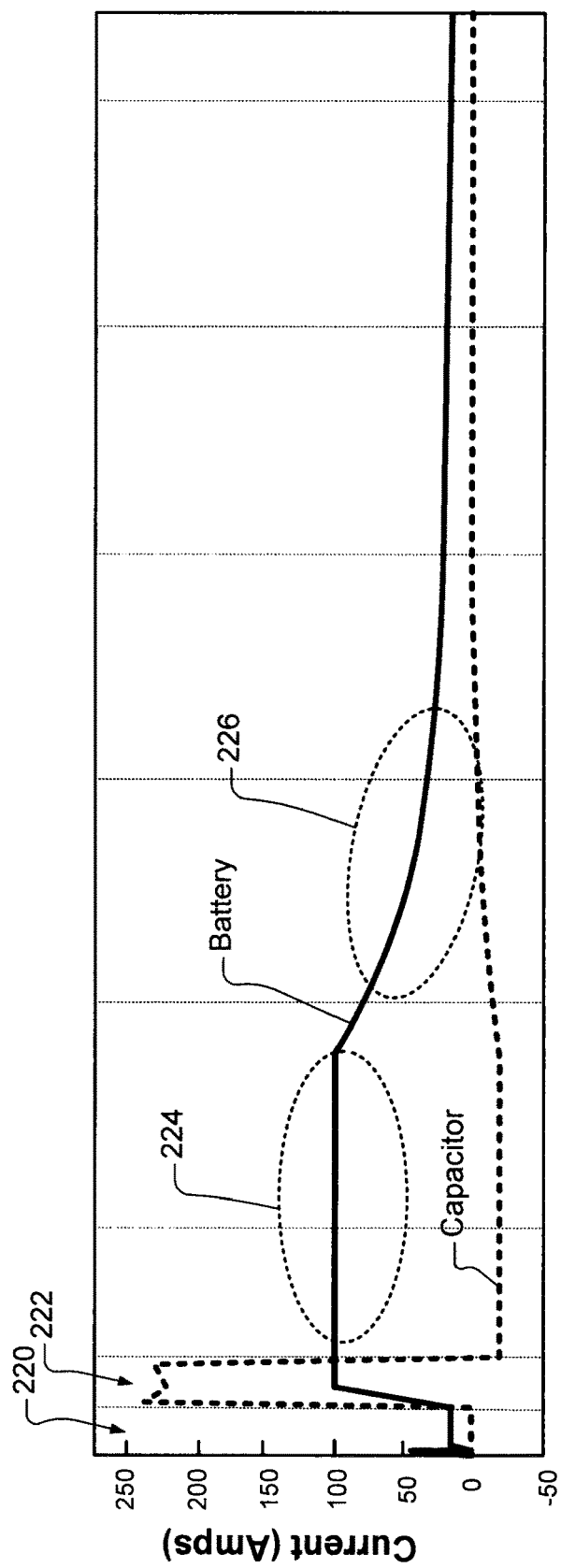

Referring now to FIGS. 2A-5, power and current supplied by the battery 108 and the capacitor 110 during a cold start is shown. In FIG. 2A, power supplied during cranking is shown. For example, the battery 108 provides about 100 A current at 12 V or 1200 W. The capacitor 110 provides about 220 A current at 48 V or 10.5 kW. In FIG. 2B, a pre-cranking event 220 is followed by a cranking event 222, and post cranking events 224 and 226.

In some examples, the power supplied by the battery during cranking is greater than or equal to 2% and less than or equal to 20% of cranking power. In some examples, the power supplied by the battery during cranking is greater than or equal to 5% and less than or equal to 20% of cranking power. In some examples, the power supplied by the battery during cranking is greater than or equal to 5% and less than or equal to 15% of cranking power. In some examples, the power supplied by the battery during cranking is greater than or equal to 7.5% and less than or equal to 12.5% of cranking power. As can be appreciated, the foregoing relationships relating to the relative sizing of the battery and capacitor provide several important benefits. For example, a battery having a lower current/capacity or C-rate corresponds to longer life and lower cost. Using the battery to assist the capacitor during starting (and/or e-boost) events and recharging the capacitor between cranking and/or e-boost using the battery allows the capacitor to be lower capacity and lower cost.

Figure 3:
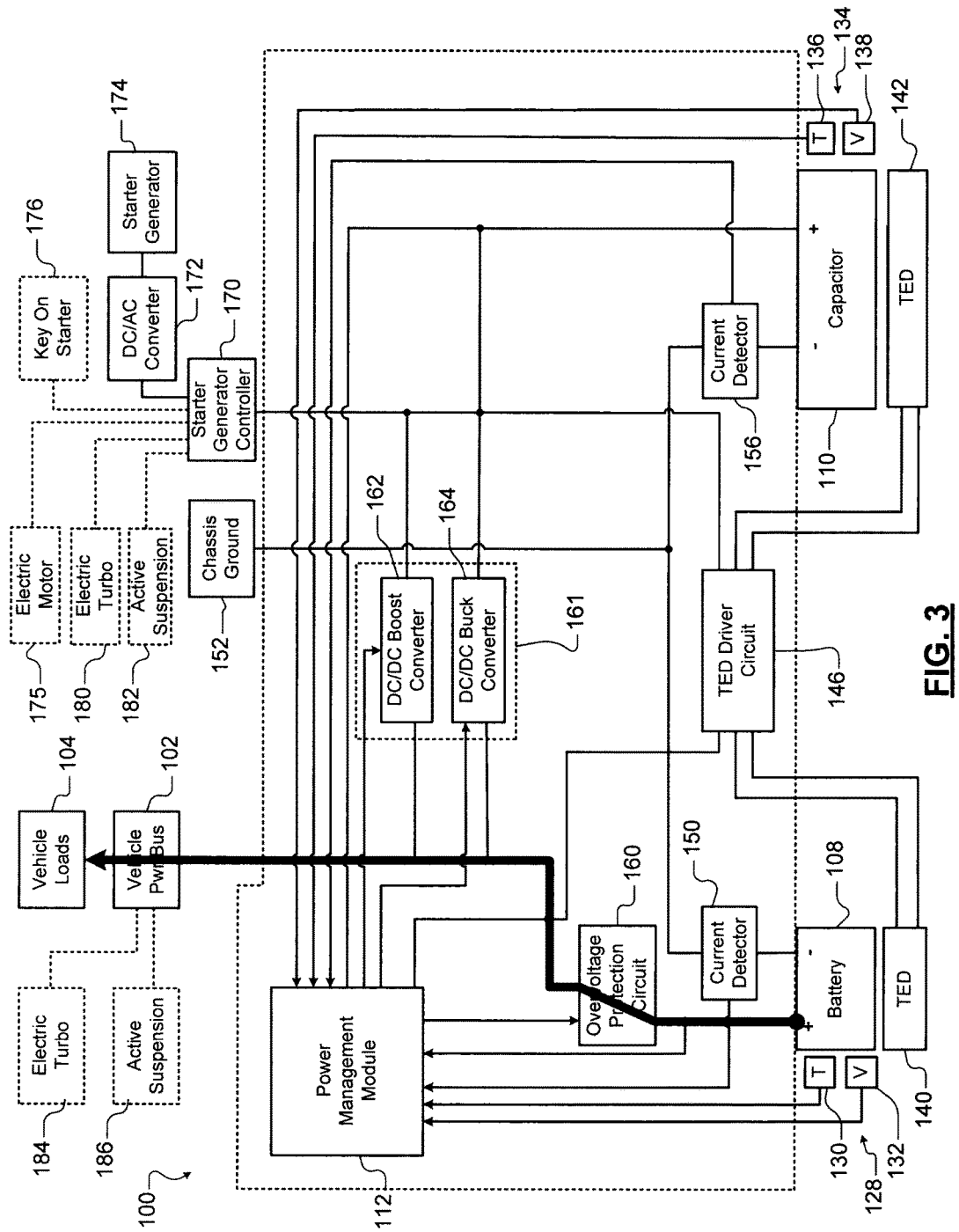
FIG. 3 is a functional block diagram showing an example of the flow of current supplied by the battery to a vehicle power bus during a key-on event preceding cranking according to the present disclosure.
Figure 4:
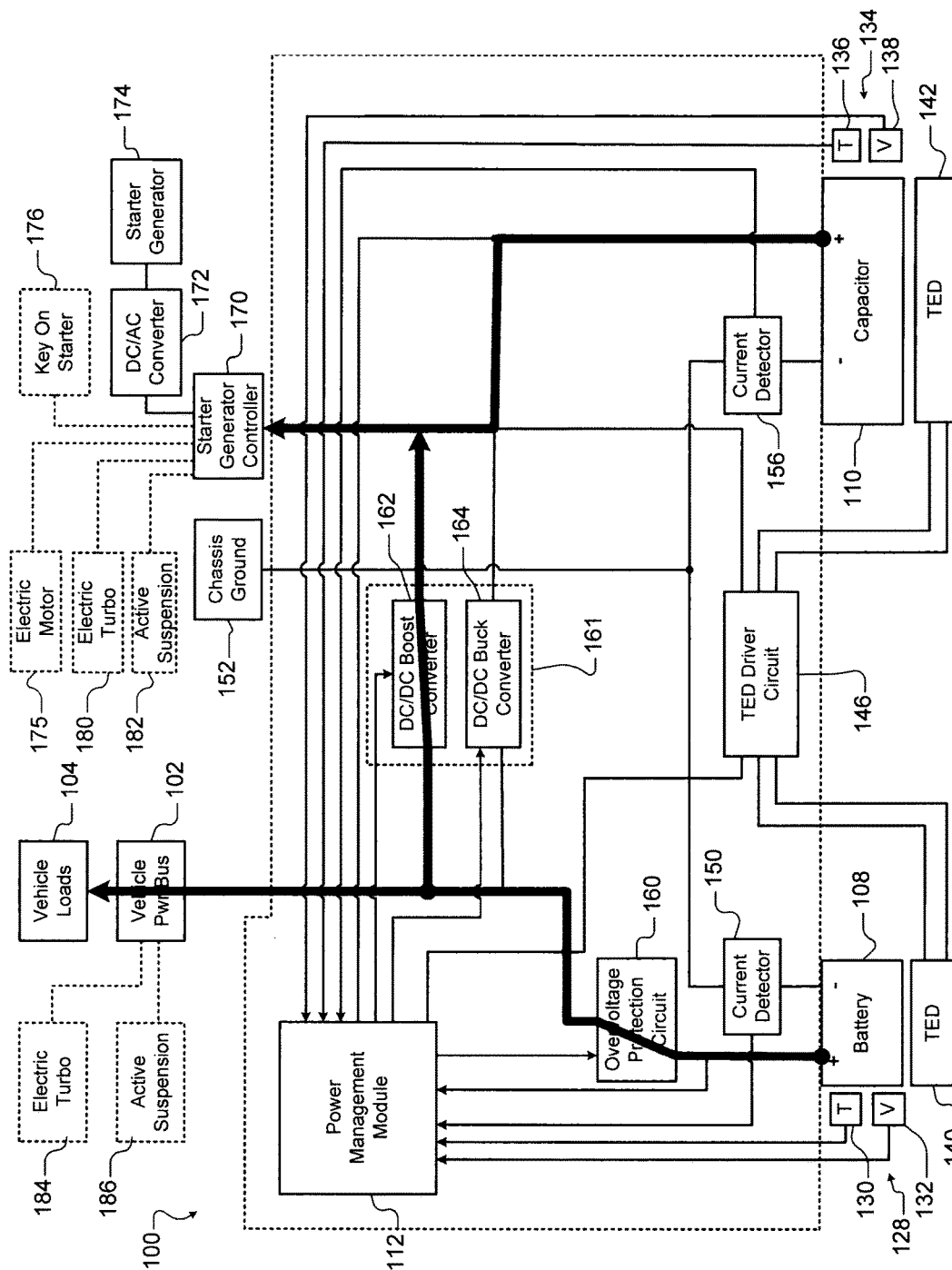
FIG. 4 is a functional block diagram showing an example of the flow of current supplied by the battery and the capacitor during cranking according to the present disclosure.

In FIG. 3, current is supplied by the battery 108 to the vehicle power bus 102, which supplies vehicle loads 104 during a key-on event preceding cold start cranking. In FIG. 4, most of the current is supplied by the capacitor 110 during cranking. The battery 108 supplies a controlled and limited amount of the current during cranking. For example in FIGS. 4 and 5, current is limited to about 100 A or 1200 Watts from the battery 108.

Figure 5:
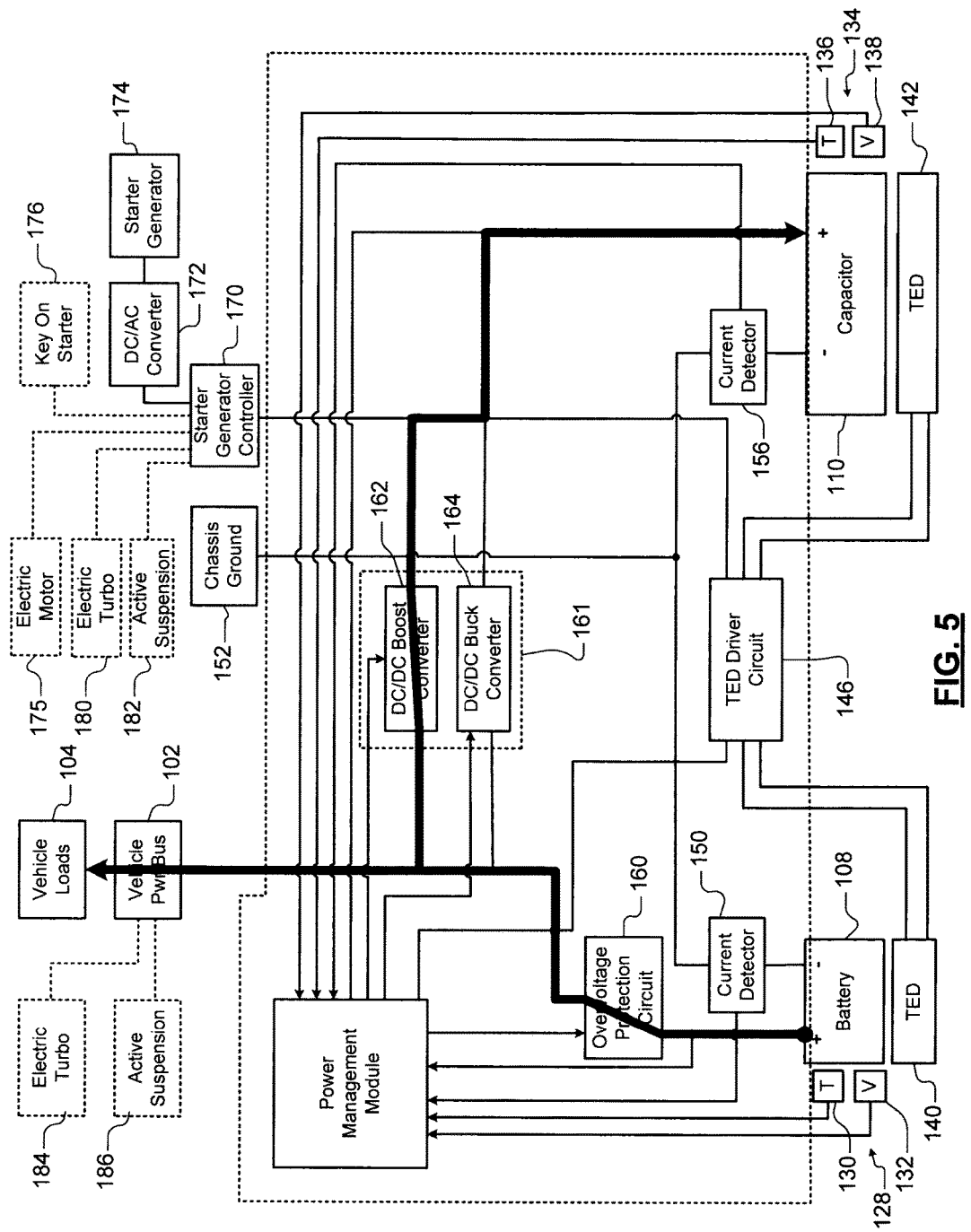
FIG. 5 is a functional block diagram showing an example of the flow of current supplied by the battery to recharge the capacitor after cranking according to the present disclosure.

In FIG. 5, during the post cranking event 204, current is supplied in a limited and controlled manner by the battery to recharge the capacitor 110. During the post cranking event 226, the current that is supplied by the battery 108 tapers off as the capacitor 110 approaches a target voltage.

Figure 6A:
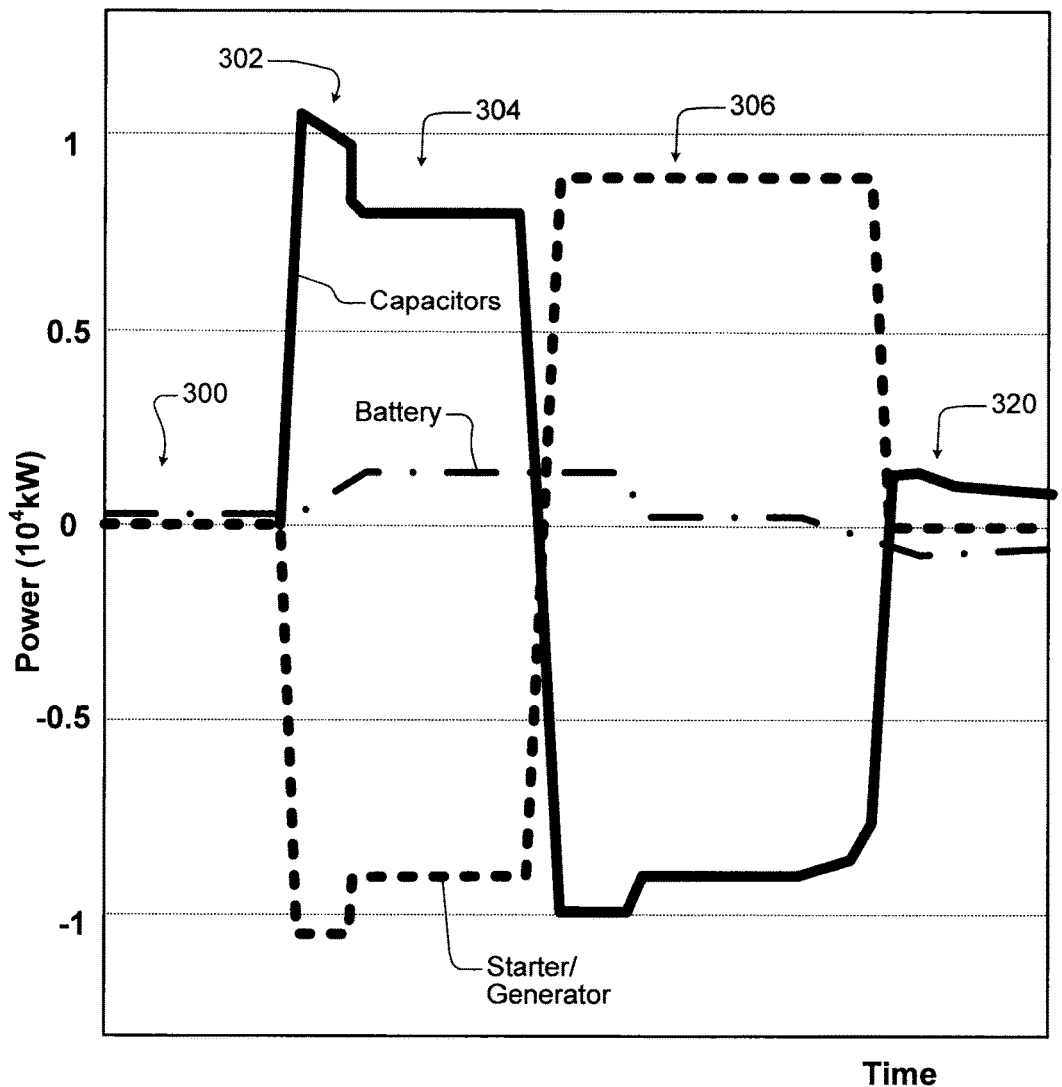
FIGS. 6A and 6B are graphs showing examples of power and current as a function of time supplied by the battery and the capacitor during cranking, e-boost, regeneration, and stop events according to the present disclosure.
Figure 6B:
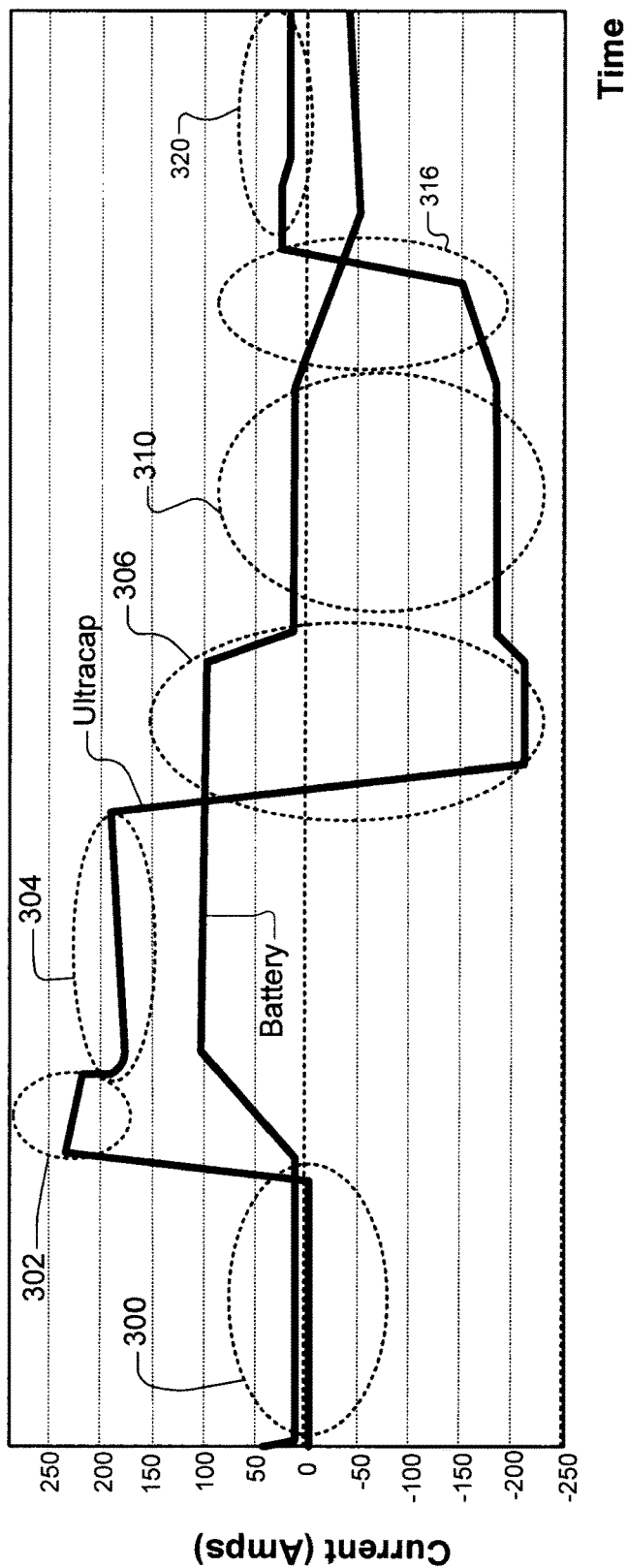

Referring now to FIGS. 6A-6B, power and current supplied by the battery 108 and the capacitor 110 are shown during various hybrid functions. In FIG. 6A, power supplied by the capacitor 110 and to the capacitor 110 during cranking and regeneration swings between about +10.5 kW and −10.5 kW in a short time period. In contrast, the power supplied by the battery 108 and to the battery 108 during the same period is limited to about +1.2 kW. In FIG. 6B, current supplied by the battery 108 and the capacitor is shown during a pre-cranking event 300, a cranking event 302, an e-boost event 304, regeneration events 306, 310 and 316, and a stop event 320.

Referring now to FIGS. 3, 4, and 7-10, current that is supplied by the battery 108, the capacitor 110 and the starter/generator 174 is shown during the various hybrid drive cycle events depicted in FIGS. 6A-6B. During the pre-cranking event 300, the cold start has not been initiated and the battery 108 supplies current to the vehicle power bus 102 and the vehicle loads 104 as can be seen in FIG. 3. During the cranking event 302, the capacitor 110 supplies the bulk of the current flow for starting the engine and the battery 108 provides limited and controlled supporting current as can be seen in FIG. 4. During the e-boost event 304, the capacitor 110 supplies the bulk of the current and the battery 108 provides limited and controlled current as can be seen in FIG. 4.

Figure 7:
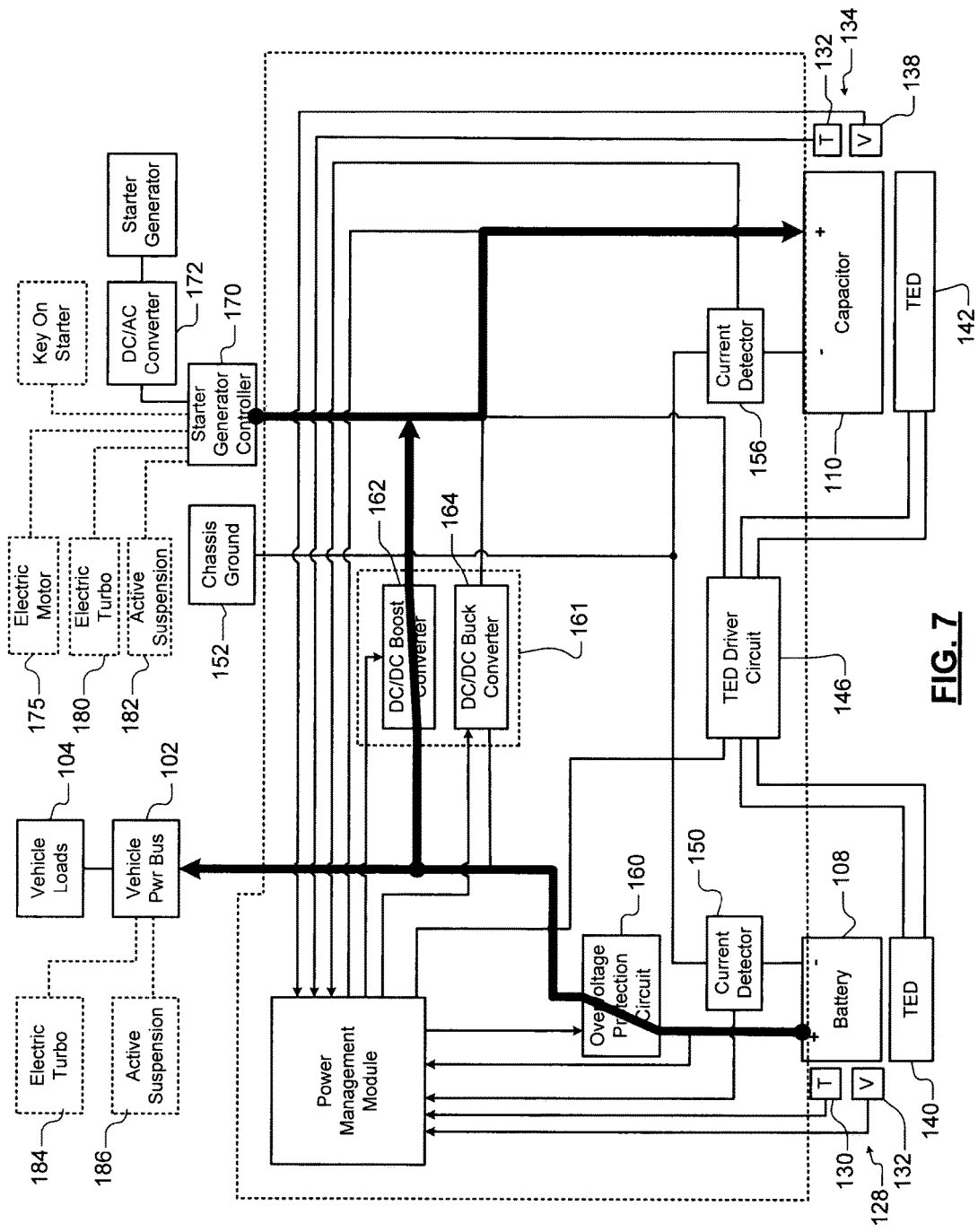
FIG. 7 is a functional block diagram showing an example of the flow of current supplied by the battery to the vehicle loads and the capacitor and current supplied by the starter/generator to the capacitor according to the present disclosure.
Figure 8:
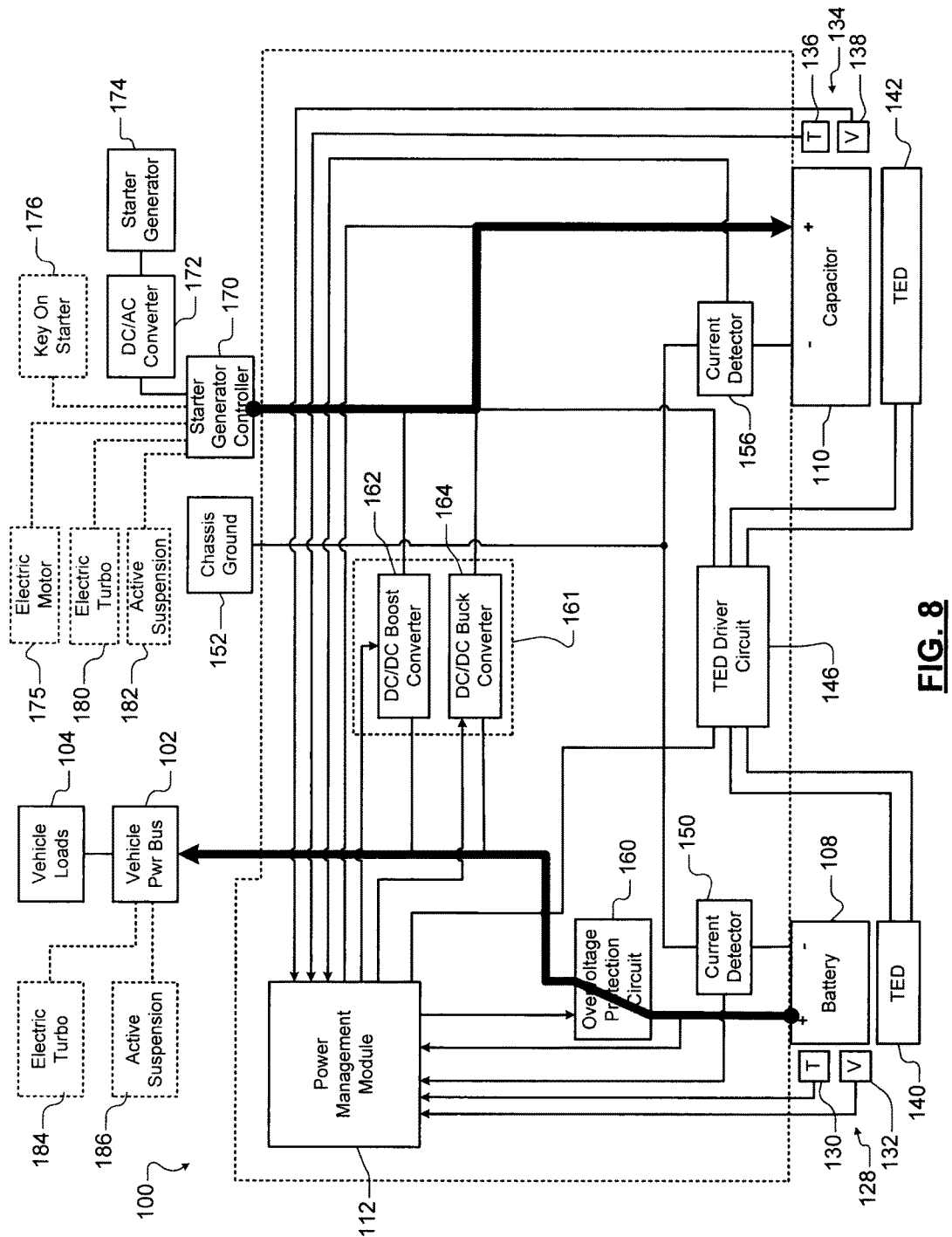
FIG. 8 is a functional block diagram showing an example of the flow of current supplied by the battery to the vehicle loads and current supplied by the starter/generator to recharge the capacitor according to the present disclosure.

In FIG. 7, during the regeneration event 306, the battery 108 supplies the vehicle power bus 102 and the vehicle loads 104. The DC/DC boost converter 162 is enabled to allow the battery 108 to help recharge the capacitor 110. Current is also supplied by the starter/generator 174 to recharge the capacitor 110. In FIG. 8, the battery 108 supplies the vehicle loads 104 and is no longer helping to recharge the capacitor 110. Current is also supplied by the starter/generator 174 to recharge the capacitor 110.

Figure 9:
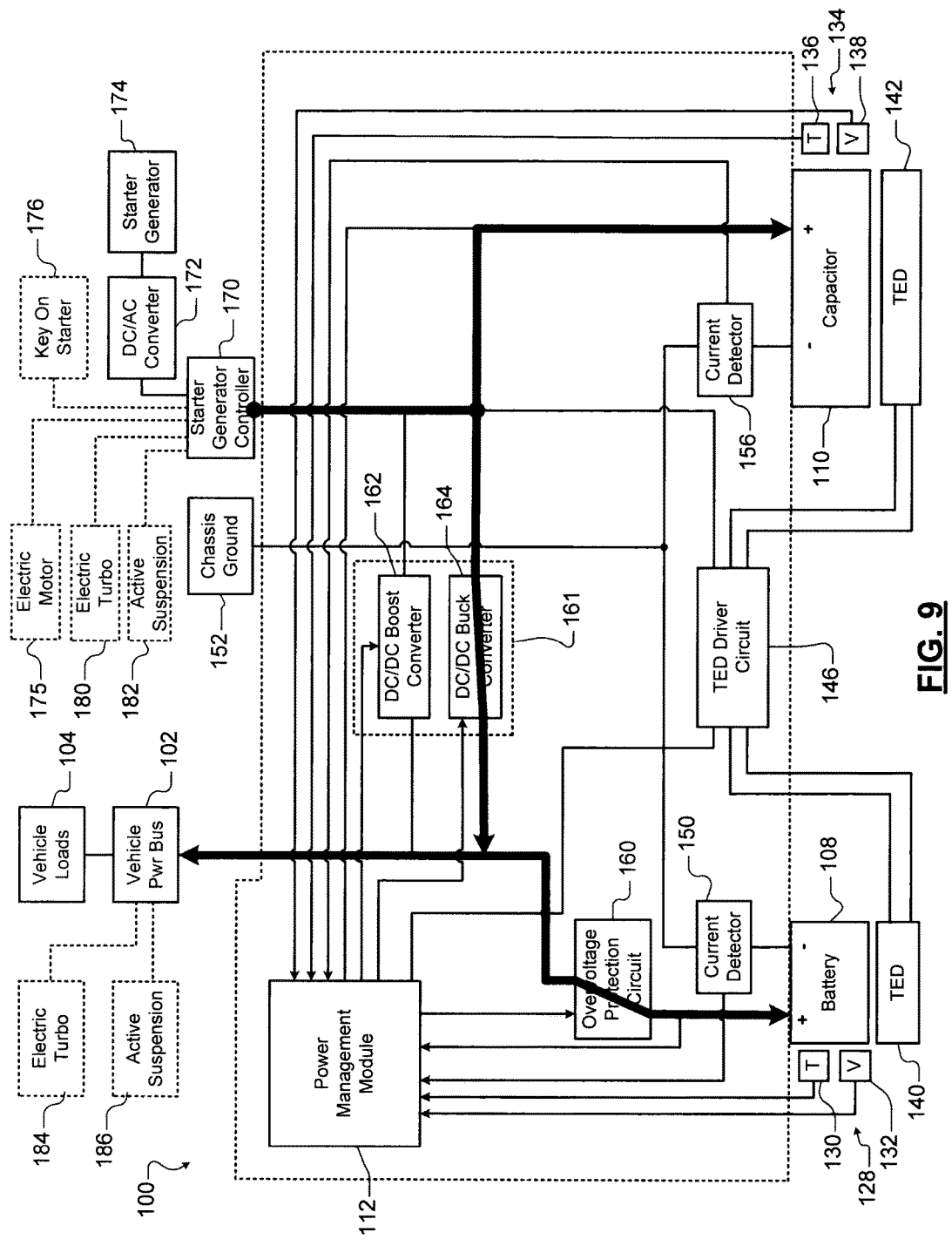
FIG. 9 is a functional block diagram showing an example of the flow of current supplied by the starter/generator to recharge the capacitor, supply the vehicle loads and recharge the battery according to the present disclosure.
Figure 10:
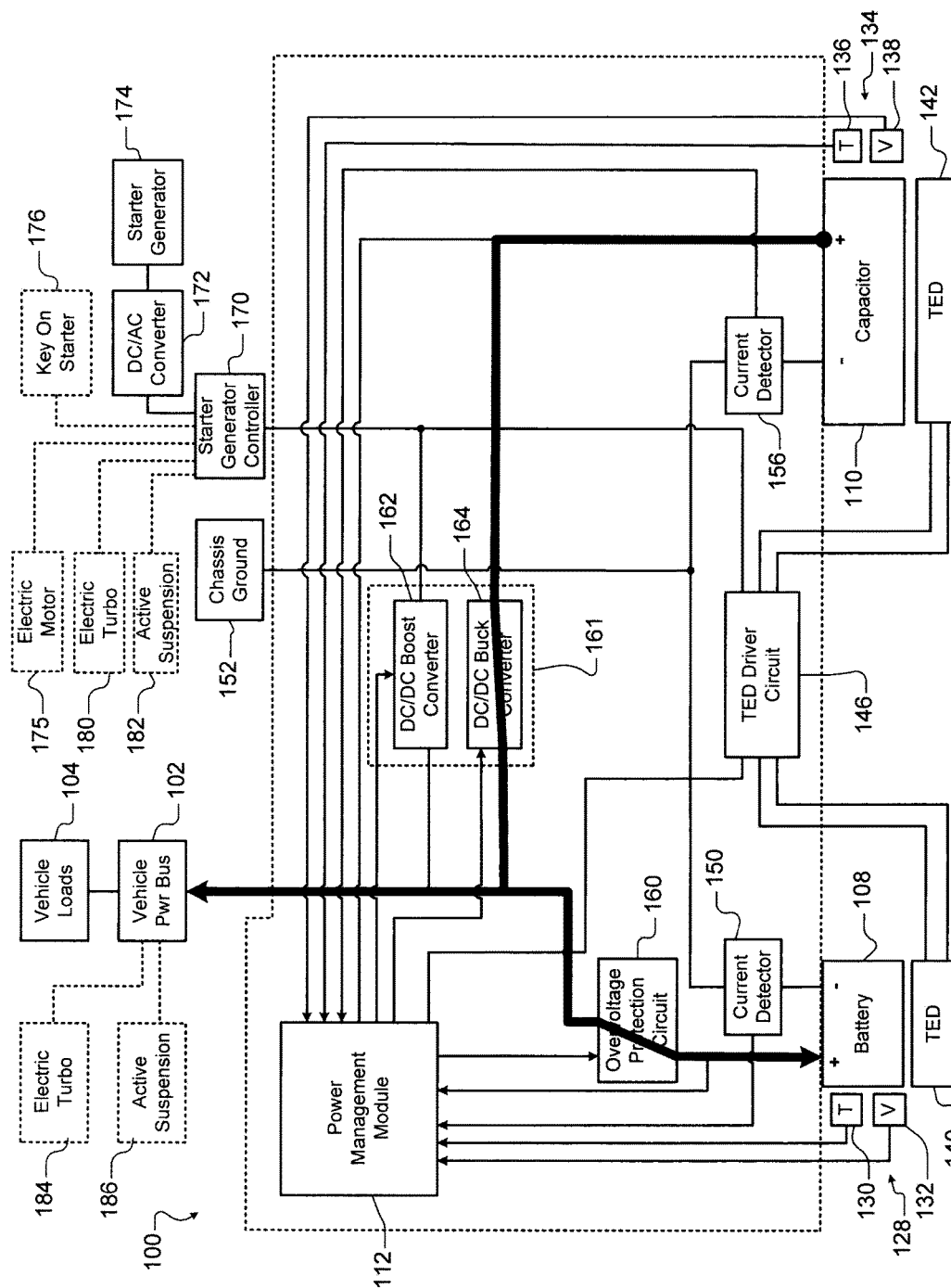
FIG. 10 is a functional block diagram showing an example of the flow of current supplied by the capacitor to recharge the battery and to supply the vehicle loads according to the present disclosure.

In FIG. 9, during the regeneration event 316, the DC/DC buck converter 164 is enabled after the capacitor 110 is above a target state of charge (SOC). This allows the starter/generator 174 to recharge the battery 108 and the capacitor 110. The starter/generator 174 also supplies the vehicle power bus 102 and the vehicle loads 104. In FIG. 10, during the stop event 320, the starter/generator 174 is no longer supplying power. The DC/DC buck converter 164 is enabled to allow the capacitor 110 to recharge the battery 108 and to supply the vehicle power bus 102 and the vehicle loads 104. Note that the stop event 320 and engine off are similar to a state when the engine is running at cruise speed in terms of system operation.

Figure 11:
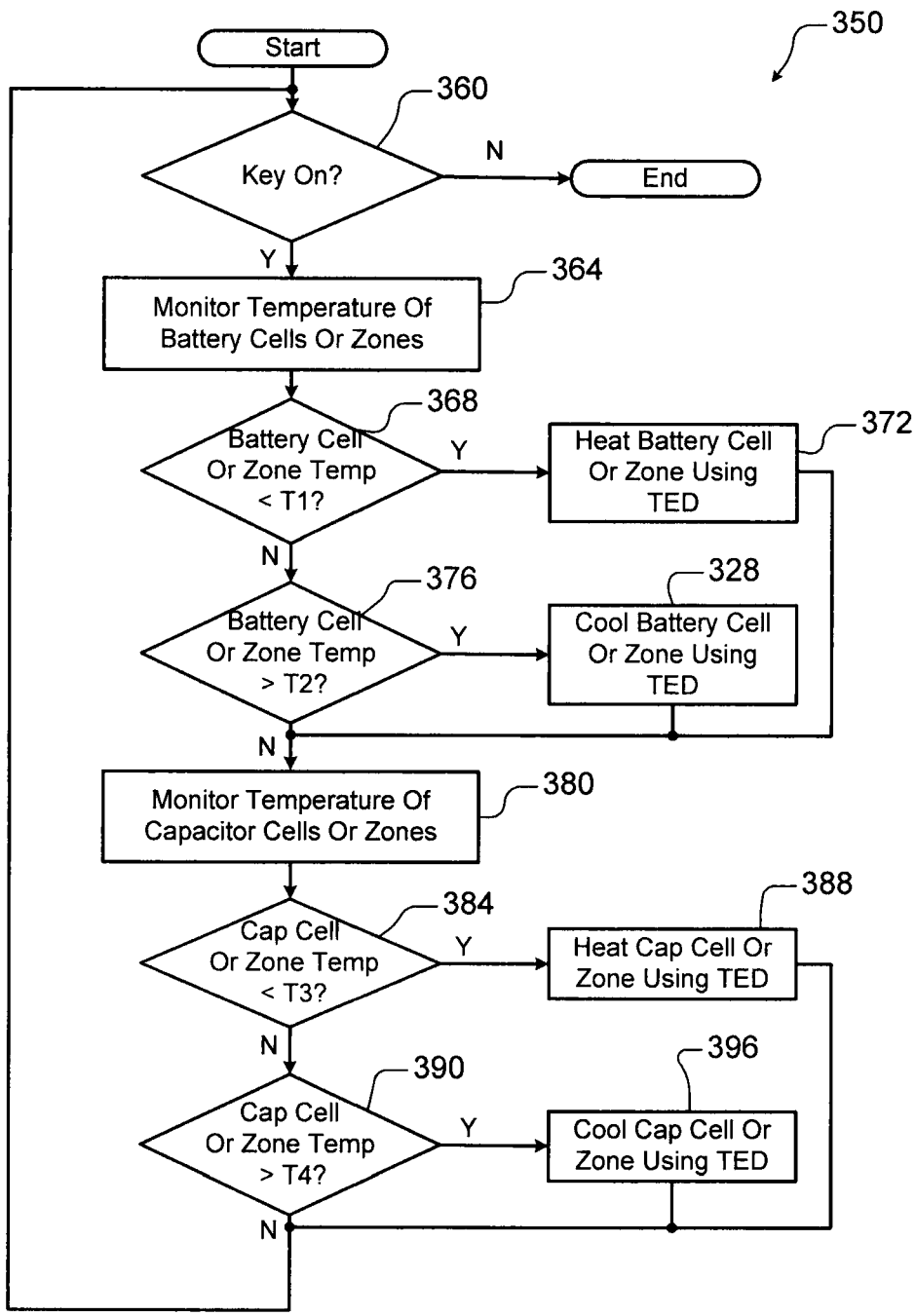
FIG. 11 is a flowchart illustrating an example of a method for controlling temperatures of the battery and the capacitor according to the present disclosure.

Referring now to FIG. 11, a method 350 for controlling the temperature of the battery 108 and the capacitor 110 during operation is shown. At 360, the method determines whether the key is on. When 360 is true, the method monitors the temperature of the battery cells individually or monitors one or more zones. At 368, the method determines whether the battery cell or zone temperature is less than a first predetermined temperature T1. If 368 is true, the battery cell or zone is heated using the TEDs and/or coolant at 322. If 368 is false, the method continues with 376 and determines whether the battery cell or zone temperature is greater than a second predetermined temperature T2. If 376 is true, the battery cell or zone is cooled using the TEDs and/or coolant at 378.

The method continues from 372, 376 or 378 and monitors a temperature of capacitor cells or zones. At 384, the method determines whether the capacitor cell or zone temperature is less than a third predetermined temperature T3. If 384 is true, the capacitor cell or zone is heated using the TEDs and/or coolant at 338. If 384 is false, the method continues with 390 and determines whether the capacitor cell or zone temperature is greater than a fourth predetermined temperature T4. If 390 is true, the capacitor cell or zone is cooled using the TEDs and/or coolant at 396.

Figure 12:
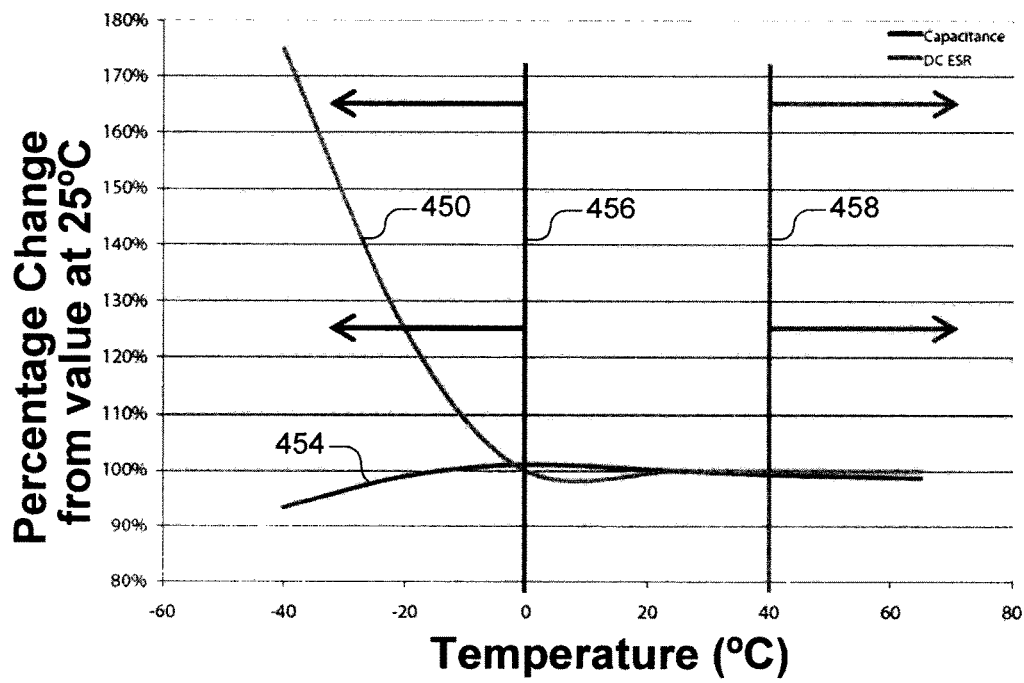
FIG. 12 is a graph illustrating DC equivalent series resistance (ESR) as a function of temperature for the capacitor.

Referring now to FIG. 12, DC equivalent series resistance (ESR) is shown at 450 and capacitance is shown at 454 as a function of temperature for the capacitor 110. Heating of the capacitor 110 above the third predetermined temperature T3 (at 456) is performed to reduce ESR at low temperatures to ensure high power and high capacity. This may be important for high powers such as cold starting and e-boost. Cooling of the capacitor 110 below the fourth predetermined temperature T4 (at 458) is performed to improve capacitor cell life.

Figure 13A:
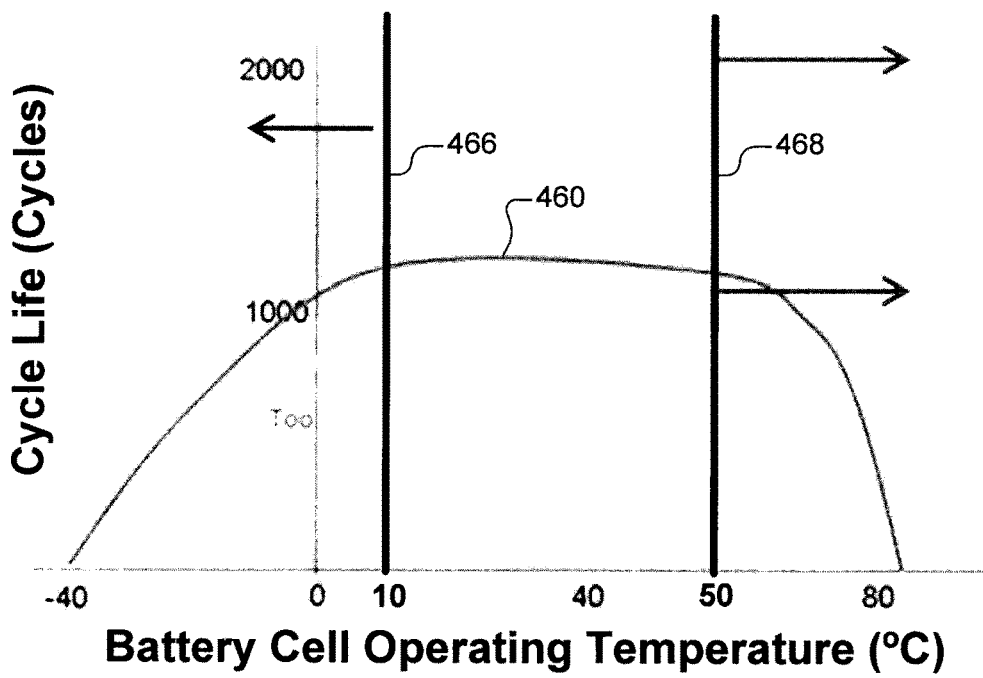
FIG. 13A is a graph illustrating cycle life as a function of cell operating temperature for the battery.
Figure 13B:
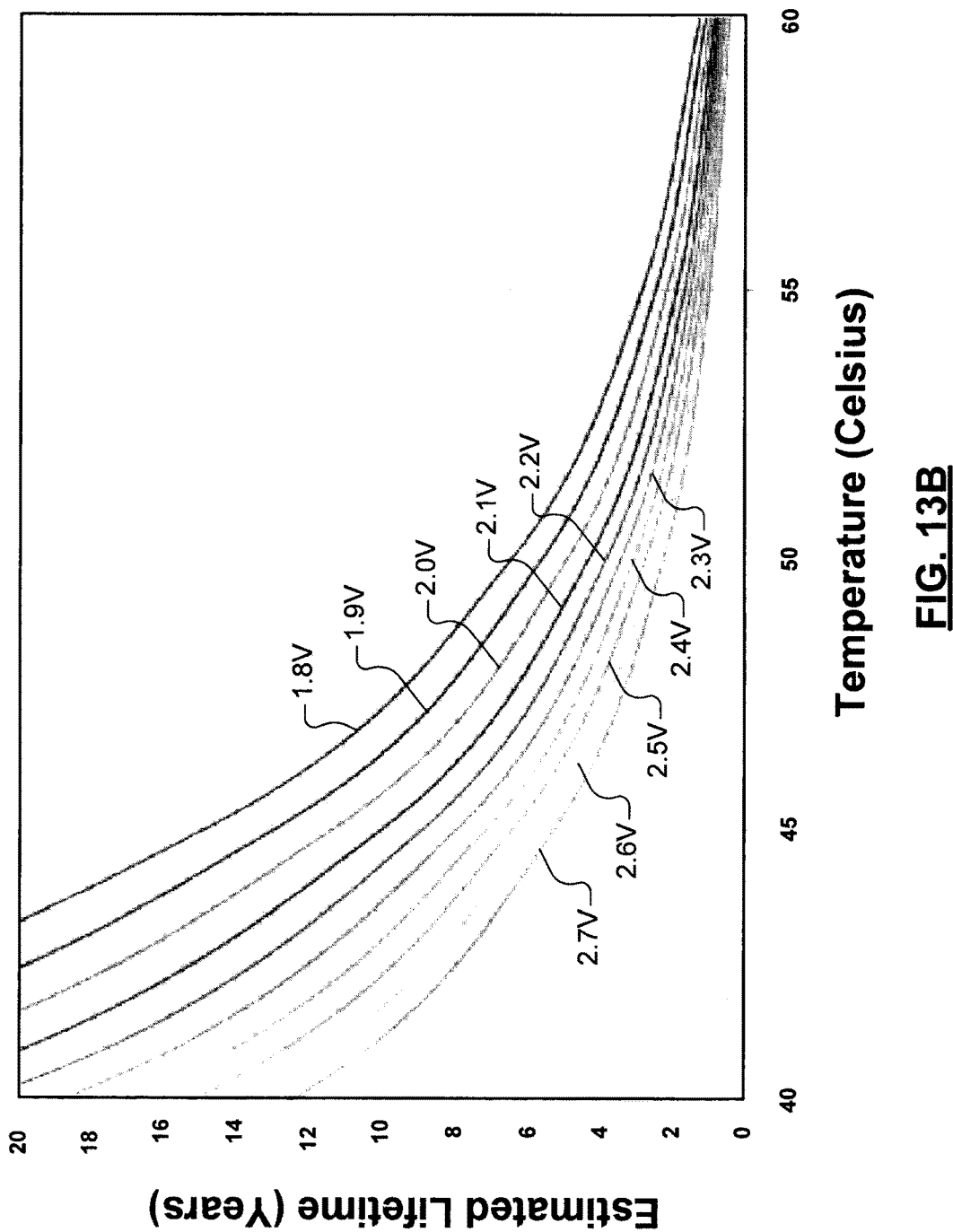
FIG. 13B is a graph illustrating estimated lifetime as a function of cell operating temperature and voltage for the capacitor.

Referring now to FIGS. 13A and 13B, the estimated cycle life of battery and the estimate life of the capacitor depend in part on operating temperature. In FIG. 13A, cycle life is shown at 460 as a function of cell operating temperature for the battery 108. Heating of the cells in the battery above the first predetermined temperature T1 (at 466) is performed to ensure low resistance, high power, full capacity, and long life. This may be important for high powers such as cold starting. Cooling of the battery cells below the second predetermined temperature T2 (at 468) is performed to improve battery cell life. In FIG. 13B, estimated lifetime as a function of cell operating temperature and voltage for the capacitor is shown. Estimated capacitor lifetime increases as operating temperature is generally reduced for a given operating voltage. Estimated capacitor lifetime generally decreases as operating voltage increases for a given operating temperature.

In some examples, the first predetermined temperature T1 for the battery cells is different than the third predetermined temperature T3 for the capacitor cells and/or the second predetermined temperature T2 for the battery cells is different than the fourth predetermined temperature T4 for the capacitor cells. Since the TEDs are arranged in zones, different temperature ranges may be used to heat and cool the battery cells relative to the capacitor cells even though the battery cells and capacitor cells are arranged in the common assembly described above. In other examples, the first predetermined temperature T1 for the battery cells is the same as the third predetermined temperature T3 for the capacitor cells and/or the second predetermined temperature T2 for the battery cells is the same as the fourth predetermined temperature T4 for the capacitor cells.

For example, the first predetermined temperature may be in a range from 5 to 15° C., the second predetermined temperature may be in a range from 45° C. to 55° C., the third predetermined temperature may be in a range from −5° C. to 5° C., and the fourth predetermined temperature may be in a range from 35° C. to 45° C., although other temperatures maybe used. In another example, the first predetermined temperature may be 10° C., the second predetermined temperature may be 50° C., the third predetermined temperature may be 0° C., and the fourth predetermined temperature may be 40° C.

Figure 14A:
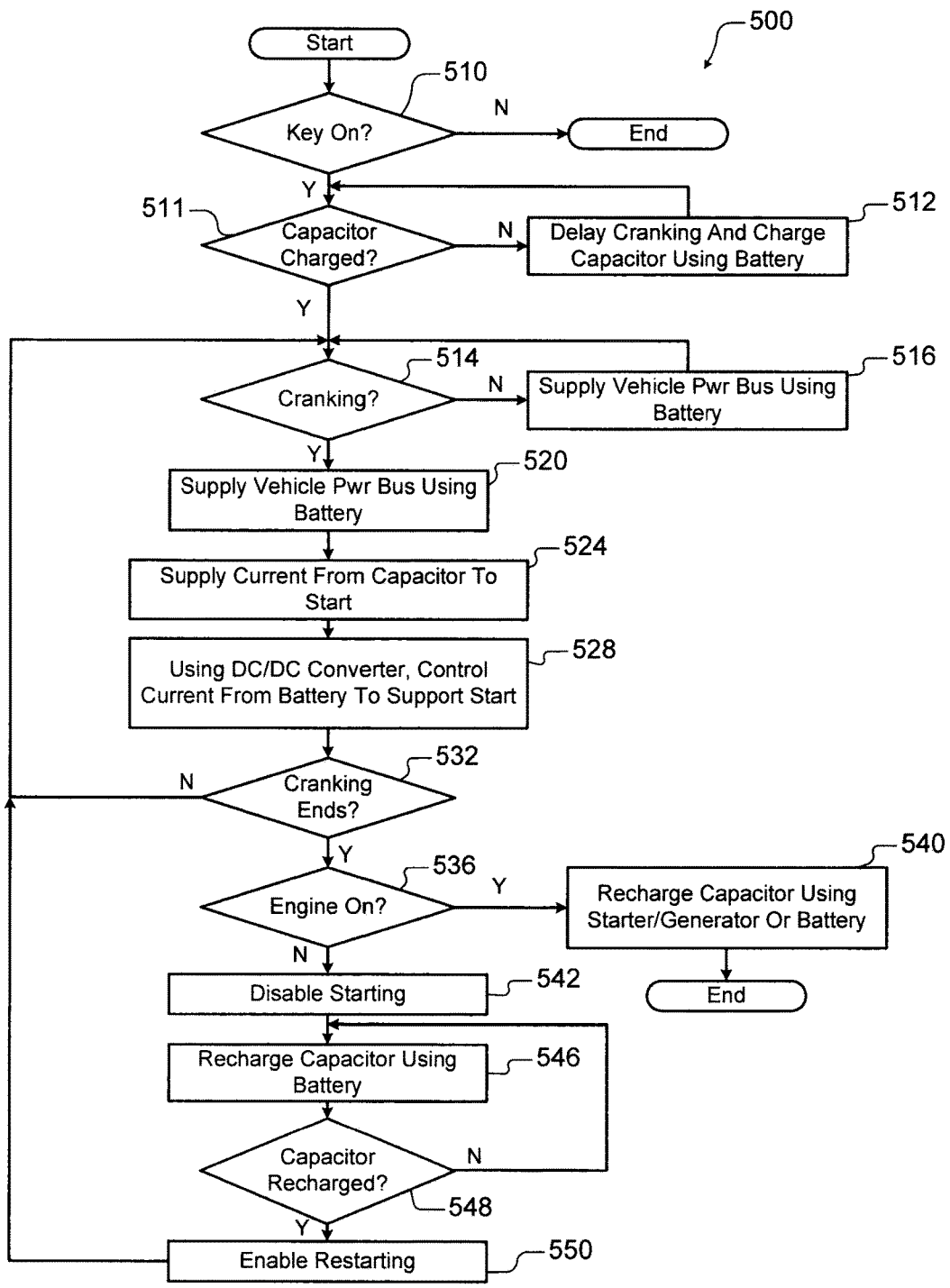
FIGS. 14A-14B are flowcharts illustrating examples of methods for controlling the battery and the capacitor during starting and/or e-boost events.

Referring now to FIG. 14A, a method 500 for controlling the battery and capacitor during a cold start is shown. At 510, the method determines whether the key is in the on position. When 510 is true, the method determines the capacitor is charged at 511. If not, the capacitor is charged and cranking may be delayed until charging is complete. When 511 is true, the method determines whether cranking has occurred at 514. If 514 is false, vehicle loads such as boardnet loads on the vehicle power bus are supplied by the battery. When 514 is true, vehicle loads are also supplied by the battery at 520. At 524, current is supplied from the capacitor to crank the engine. At 528, limited and controlled flow of current is supplied by the battery to support the cranking of the engine.

At 532, the method determines whether cranking has ended. If 532 is true, the method determines whether the engine is on at 536. If 536 is true, the capacitor is recharged using the starter/generator and/or the battery at 540. If 536 is false, starting is disabled at 542. At 546, the capacitor is recharged by the battery. If the capacitor is not recharged as determined at 548, the method returns to 546. If the capacitor is recharged as determined at 548, starting is enabled at 550 and the method returns to 514.

Figure 14B:
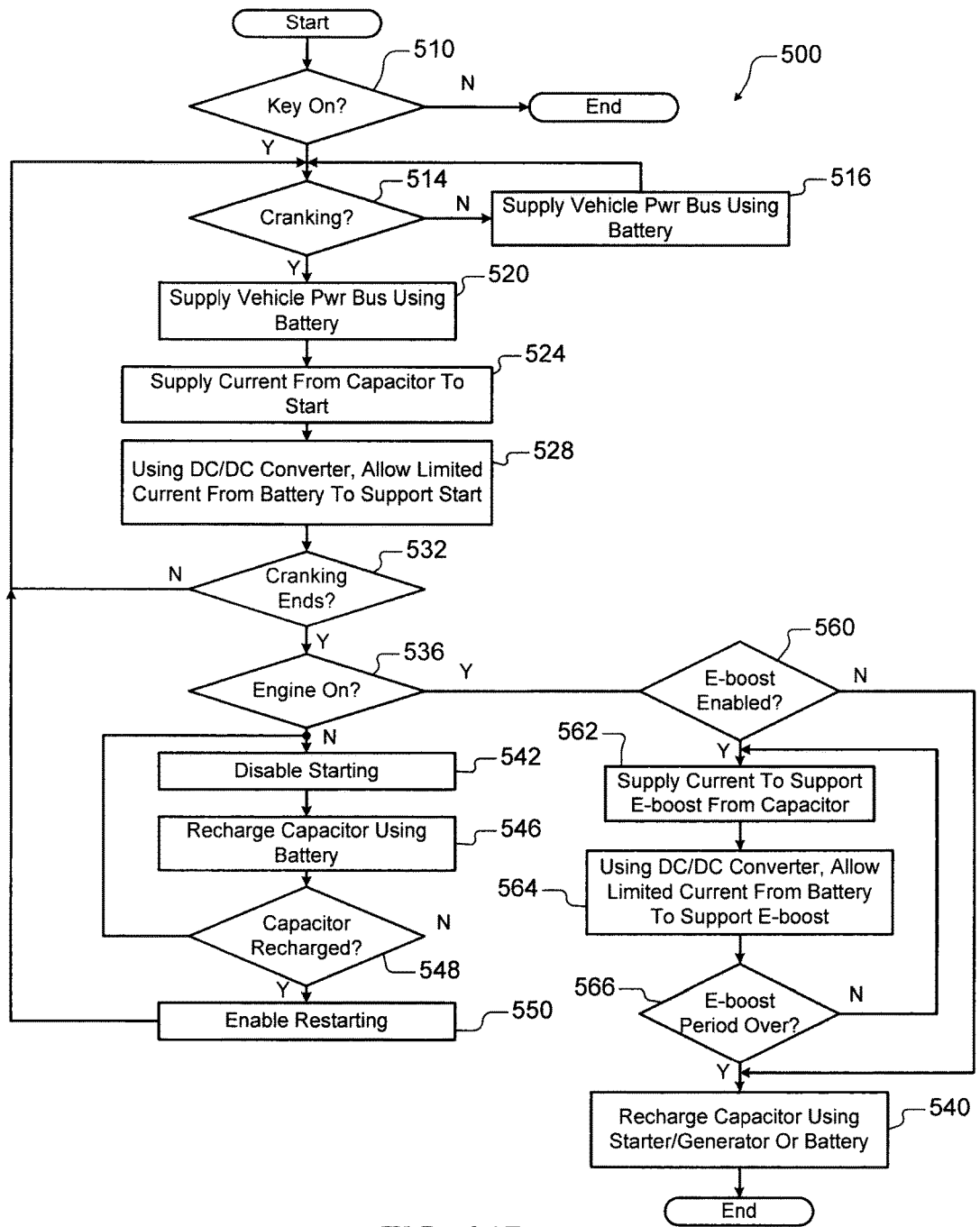

Referring now to FIG. 14B, an example of operation is shown for vehicles including e-boost functionality. At 560, the method determines whether e-boost is enabled (fully or partially). For example only, e-boost may be fully disabled or power limited (partially enabled) when the battery or the capacitor is not fully charged or in a predetermined SOC or SOH, although other factors may be used to enable or disable e-boost. If 560 is true, current is supplied from the capacitor to support e-boost at 562. The current may be limited when the e-boost is power limited.

At 564, current is supplied by the battery to support e-boost in a controlled and limited manner using the DC/DC converter. At 566, the method determines whether the e-boost period is over. This decision may be based on a predetermined period, the occurrence of other events such as stable running operation of the engine, other factors, or a combination of these factors. If 566 is false, the method returns to 562. Control continues from 560 and 566 (if true) with 540.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A power management system for a hybrid vehicle including an engine, comprising:
   a battery;
   a vehicle power bus that distributes power from the battery to vehicle loads;
   a capacitor, wherein the capacitor includes one of a plurality of supercapacitors and a plurality of ultracapacitors;
   a starter/generator controller that communicates with the capacitor and the battery;
   a power management module configured to:
      supply power from the capacitor to the starter/generator controller during cranking of the engine; and
      supply power from the battery to the starter/generator controller during the cranking of the engine,
      wherein the power supplied by the battery is greater than or equal to 2% and less than or equal to 20% of a total power supplied to the starter/generator controller during the cranking of the engine; and
   a battery and capacitor assembly including:
      a cooling plate assembly;
      a heat spreader;
      zoned thermoelectric devices; and
      mounting brackets,
      wherein the battery includes pouch-type battery cells and the capacitor includes pouch-type capacitor cells, and
      wherein the pouch-type battery cells and the pouch-type capacitor cells are arranged between the mounting brackets and in thermal contact with the heat spreader and the zoned thermoelectric devices.

2. The power management system of claim 1, wherein the battery has a current/capacity ratio that is less than or equal to 6.

3. The power management system of claim 1, wherein a capacity of the battery is less than or equal to 20 Ah.

4. The power management system of claim 1, wherein current from the battery is controlled to less than or equal to 100 amps during cranking.

5. The power management system of claim 1, further comprising an overvoltage protection circuit connected to the battery.

6. The power management system of claim 1, further comprising:
   a first current detector circuit connected in series with the battery; and
   a second current detector circuit connected in series with the capacitor.

7. The power management system of claim 1, further comprising:
   a DC/DC converter connected between the capacitor and the vehicle power bus,
   wherein the DC/DC converter controls the current flowing from the battery to the starter/generator controller during cranking of the engine.

8. The power management system of claim 7, wherein the DC/DC converter includes:
   a DC/DC boost converter connected between the capacitor and the vehicle power bus; and a DC/DC buck converter connected between the capacitor and the vehicle power bus.

9. The power management system of claim 8, wherein, during cranking of the engine, the power management module disables the DC/DC buck converter and enables the DC/DC boost converter.

10. The power management system of claim 9, wherein the power management module controls the DC/DC boost converter to control current supplied by the battery to the starter/generator controller during the cranking.

11. The power management system of claim 1, further comprising an electric motor or starter/generator connected to the starter/generator controller, wherein the cranking of the engine is followed by an e-boost event, and wherein power is supplied to the electric motor or starter/generator during the e-boost event.

12. The power management system of claim 11, wherein the power management module is further configured to:
supply power from the capacitor to the starter/generator controller during the e-boost event; and
supply power from the battery to the starter/generator controller during the e-boost event,
wherein the power supplied by the battery is greater than or equal to 2% and less than or equal to 20% of a total power supplied to the starter/generator controller during the e-boost event.

13. The power management system of claim 1, further comprising:
an AC/DC converter connected to the starter/generator controller; and
a starter/generator connected to the AC/DC converter and the engine.

14. The power management system of claim 13, wherein the power management module is further configured to:
recharge the capacitor using power generated by the starter/generator during a regeneration event; and
control flow of power from the starter/generator or the capacitor to the battery during the regeneration event,
wherein the power flowing from the starter/generator or the capacitor to the battery is greater than or equal to 2% and less than or equal to 20% of a total power supplied to the battery during the regeneration event.

15. The power management system of claim 1, wherein the power from the battery is greater than or equal to 5% and less than or equal to 15% of the total power supplied to the starter/generator controller during the cranking of the engine.

16. The power management system of claim 1, wherein the zoned thermoelectric devices maintain the battery within a first predetermined temperature range and the capacitor within a second predetermined temperature range.

17. The power management system of claim 16, wherein the first predetermined temperature range is different than the second predetermined temperature range.

18. A method for providing power in a hybrid vehicle including an engine, comprising:
distributing power from a battery to vehicle loads;
supplying power from a capacitor to a starter/generator controller during cranking of the engine,
wherein the capacitor includes one of a plurality of supercapacitors and a plurality of ultracapacitors;
supplying power from the battery to the starter/generator controller during the cranking of the engine,
wherein the power from the battery is greater than or equal to 2% and less than or equal to 20% of a total power supplied to the starter/generator controller during the cranking of the engine;
arranging the battery and the capacitor in a battery and capacitor assembly including a cooling plate assembly, a heat spreader, zoned thermoelectric devices, and mounting brackets,
wherein the battery includes pouch-type battery cells and the capacitor includes pouch-type capacitor cells; and
arranging the pouch-type battery cells and the pouch-type capacitor cells between the mounting brackets and in thermal contact with the heat spreader and the zoned thermoelectric devices.

19. The method of claim 18, wherein the battery has a current/capacity ratio that is less than or equal to 6.

20. The method of claim 18, wherein a capacity of the battery is less than or equal to 20 Ah.

21. The method of claim 18, wherein current from the battery is controlled to less than or equal to 100 amps during the cranking.

22. The method of claim 18, further comprising:
detecting current supplied by the battery; and
detecting current supplied by the capacitor.

23. The method of claim 18, further comprising controlling the current flowing from the battery to the starter/generator controller during cranking of the engine.

24. The method of claim 23, further comprising:
connecting a DC/DC boost converter between the capacitor and a vehicle power bus; and
connecting a DC/DC buck converter between the capacitor and the vehicle power bus.

25. The method of claim 24, further comprising, during cranking of the engine, disabling the DC/DC buck converter and enabling the DC/DC boost converter.

26. The method of claim 25, further comprising controlling the DC/DC boost converter to control current flow supplied by the battery to the starter/generator controller during cranking.

27. The method of claim 18, further comprising:
connecting an electric motor or starter/generator to the starter/generator controller,
wherein the cranking of the engine is followed by an e-boost event; and
supplying power to the electric motor or starter/generator during the e-boost event.

28. The method of claim 27, further comprising:
supplying power from the capacitor to the starter/generator controller during the e-boost event; and
supplying power from the battery to the starter/generator controller during the e-boost event,
wherein the power from the battery is greater than or equal to 2% and less than or equal to 20% of a total power supplied to the starter/generator controller during the e-boost event.

29. The method of claim 18, further comprising:
connecting an AC/DC converter to the starter/generator controller; and
connecting a starter/generator the AC/DC converter and the engine.

30. The method of claim 29, further comprising:
recharging the capacitor using power generated by the starter/generator during a regeneration event; and
controlling flow of power from the starter/generator to the battery during the regeneration event,
wherein the power flowing from the starter/generator or the capacitor to the battery is greater than or equal to 2% and less than or equal to 20% of a total power supplied to the battery during the regeneration event.

31. The method of claim 18, wherein the power from the battery is greater than or equal to 5% and less than or equal to 15% of the total power supplied to the starter/generator controller during the cranking of the engine.

32. The method of claim 18, further comprising maintaining the battery within a first predetermined temperature range and the capacitor within a second predetermined temperature range using the zoned thermoelectric devices.

33. The method of claim 32, wherein the first predetermined temperature range is different than the second predetermined temperature range.

* * * * *